US011504823B2

(12) United States Patent
Amid et al.

(10) Patent No.: US 11,504,823 B2
(45) Date of Patent: Nov. 22, 2022

(54) LOW-SHEDDING NONWOVEN ABRASIVE ARTICLES

(71) Applicants: SAINT-GOBAIN ABRASIVES, INC., Worcester, MA (US); SAINT-GOBAIN ABRASIFS, Conflans-Sainte-Honorine (FR)

(72) Inventors: Hooman Amid, Edinburg, TX (US); Shyiguei Hsu, Plano, TX (US); Fernando J. Ramirez, Reynosa (MX); Karen Judith Sandoval Herrera, Reynosa (MX); Ying Cai, Niskayuna, NY (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 645 days.

(21) Appl. No.: 16/370,799

(22) Filed: Mar. 29, 2019

(65) Prior Publication Data

US 2019/0299364 A1 Oct. 3, 2019

Related U.S. Application Data

(60) Provisional application No. 62/650,236, filed on Mar. 29, 2018.

(51) Int. Cl.
  *B24D 3/28* (2006.01)
  *C09K 3/14* (2006.01)
(52) U.S. Cl.
  CPC ............. *B24D 3/28* (2013.01); *C09K 3/1409* (2013.01)

(58) Field of Classification Search
  CPC .......... B24D 3/18; B24D 3/32; C09K 3/1409
  See application file for complete search history.

(56) References Cited

U.S. PATENT DOCUMENTS

| 2,958,593 | A |   | 11/1960 | Hoover et al. |
| 4,227,350 | A | * | 10/1980 | Fitzer ................... B24D 11/005 51/295 |
| 4,734,104 | A |   | 3/1988  | Broberg |

(Continued)

FOREIGN PATENT DOCUMENTS

| CN | 104822493 A | 8/2015 |
| EP | 0912294 B1 | 4/2003 |

(Continued)

OTHER PUBLICATIONS

PCT International Search Report dated Aug. 7, 2019 (12 pages).

*Primary Examiner* — Pegah Parvini
(74) *Attorney, Agent, or Firm* — Abel Schillinger, LLP; Joseph P. Sullivan

(57) ABSTRACT

Articles and methods regarding the making and use of low-shedding nonwoven abrasive articles, such as abrasive wheels and hand pads, that have a low shed rate and achieve a high grind ratio. The abrasive articles comprise a blend of a plurality of primary abrasive particles and a plurality of reinforcing abrasive particles that is disposed on a nonwoven web substrate. The primary abrasive particles have an average particle size equal to or larger than the average fiber diameter of the substrate fibers, and the reinforcing abrasive particles have an average particle size smaller than the average fiber diameter.

20 Claims, 20 Drawing Sheets

(56) References Cited

U.S. PATENT DOCUMENTS

| | | | |
|---|---|---|---|
| 5,007,943 | A | 4/1991 | Kelly et al. |
| 5,011,512 | A | 4/1991 | Wald et al. |
| 5,591,239 | A | 1/1997 | Larson et al. |
| 5,611,825 | A | 3/1997 | Engen et al. |
| 5,669,941 | A | 9/1997 | Peterson |
| 5,702,811 | A | 12/1997 | Ho et al. |
| 5,840,090 | A | 11/1998 | Ho et al. |
| 5,876,470 | A | 3/1999 | Abrahamson |
| 5,942,015 | A | 8/1999 | Culler et al. |
| 6,572,666 | B1 | 6/2003 | Nettleship et al. |
| 7,985,269 | B2 | 7/2011 | Ludwig |
| 8,551,203 | B2 | 10/2013 | Marlin et al. |
| 8,888,561 | B2 | 11/2014 | McArdle et al. |
| 9,079,294 | B2 | 7/2015 | Holmes |
| 9,221,151 | B2 | 12/2015 | Seth |
| 9,266,221 | B2 | 2/2016 | Hsu et al. |
| 9,314,903 | B2 | 4/2016 | Woo et al. |
| 9,434,051 | B2 | 9/2016 | Hsu et al. |
| 2004/0098923 | A1 | 5/2004 | Hood et al. |
| 2007/0011951 | A1 | 1/2007 | Gaeta et al. |
| 2013/0012112 | A1 | 1/2013 | Hsu et al. |
| 2015/0183090 | A1 | 7/2015 | Hsu et al. |
| 2016/0008957 | A1 | 1/2016 | Kaur et al. |
| 2016/0354899 | A1 | 12/2016 | Zwier et al. |

FOREIGN PATENT DOCUMENTS

| | | |
|---|---|---|
| EP | 2914402 A1 | 9/2015 |
| JP | 2005230929 A | 9/2005 |
| WO | 2014010655 A1 | 1/2014 |
| WO | 2014070468 A1 | 5/2014 |

\* cited by examiner

LOW-SHEDDING NONWOVEN ABRASIVE ARTICLES

CROSS-REFERENCE TO RELATED APPLICATION(S)

The present application claims priority under 35 U.S.C. § 119(e) to U.S. Provisional Patent Application No. 62/650,236, filed Mar. 29, 2018, entitled "LOW-SHEDDING NONWOVEN ABRASIVE ARTICLES," naming as inventors Hooman AMID et al., which application is assigned to the current assignee hereof and is incorporated by reference herein in its entirety.

FIELD OF THE DISCLOSURE

This disclosure, in general, relates to articles and methods regarding low-shedding nonwoven abrasives that achieve a high grind ratio and comprise a blend of a first plurality and a second plurality of abrasive particles that is disposed on the fibers of a nonwoven web, wherein the first plurality of abrasive particles has an average particle size larger than an average fiber diameter of the fibers, and the second plurality of abrasive particles have an average particle size smaller than the average fiber diameter.

BACKGROUND

Abrasive articles, such as nonwoven abrasive articles, are used in various industries to abrade work pieces, such as by grinding, buffing, or polishing in order to condition the surface of the workpiece to a desired condition (e.g., coating removal, surface roughness, gloss, transparency, etc.). Abrading using nonwoven abrasive articles spans a wide industrial scope from aerospace to optics, and plays a particularly important part in metal fabrication industries. Such manufacturing operations can use nonwoven abrasives to remove bulk material and achieve desired surface characteristics for workpieces.

Surface characteristics include shine, texture, and uniformity. For example, manufacturers of various types of components use nonwoven abrasive articles to grind and polish surfaces to a desired uniformly smooth surface. Additionally, nonwoven abrasive articles are used to prepare workpiece surfaces before and after applying a coating material, such as a polymer coating (e.g., a varnish or paint) or a ceramic coating (e.g., a thermal spray coating). In some cases, the workpieces can have complex shapes that conventional abrasives do not have the right balance of physical properties and abrasive performance to provide a satisfactory finish. Therefore, there continues to be a need for improved abrasive products, including improved nonwoven abrasive products.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
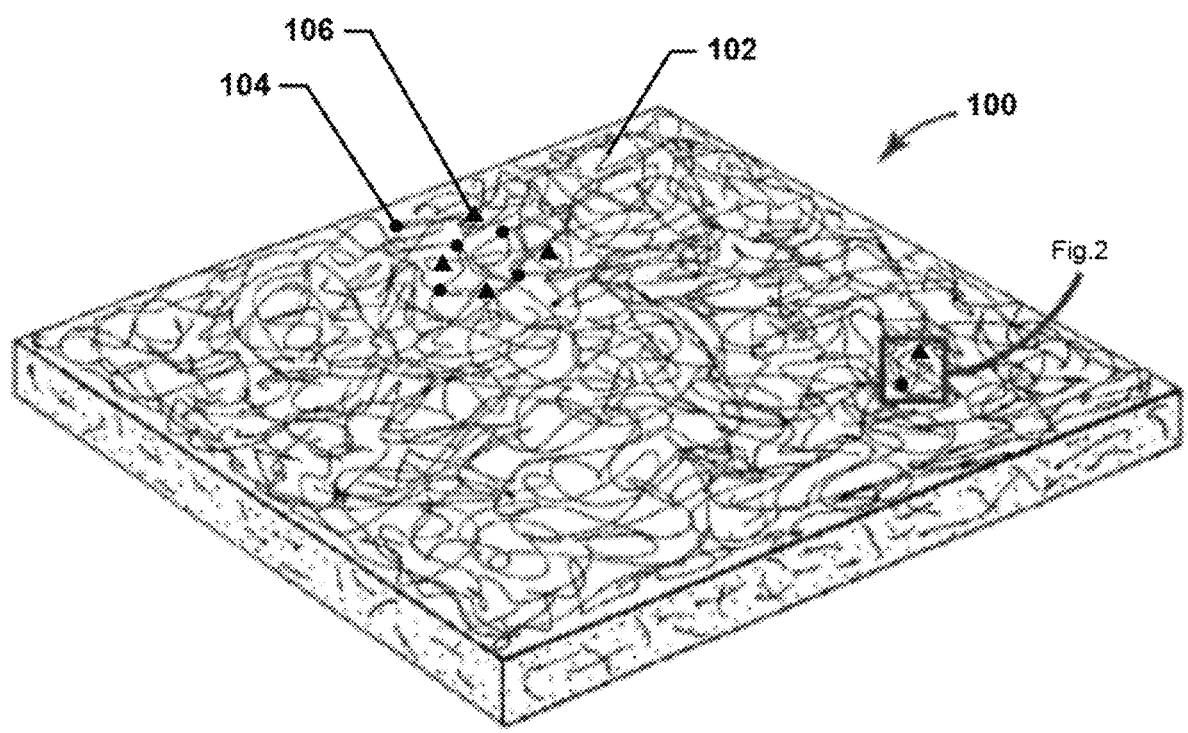
FIG. 1 is an illustration of a nonwoven web according to an embodiment.

An embodiment of a nonwoven abrasive article 100 is illustrated in FIG. 1. A nonwoven abrasive article 100 comprises a substrate comprising a web of lofty nonwoven fibers 102 and a blend of a first abrasive particle 104 and a second abrasive particle 106 disposed on the nonwoven fibers.

Figure 2:
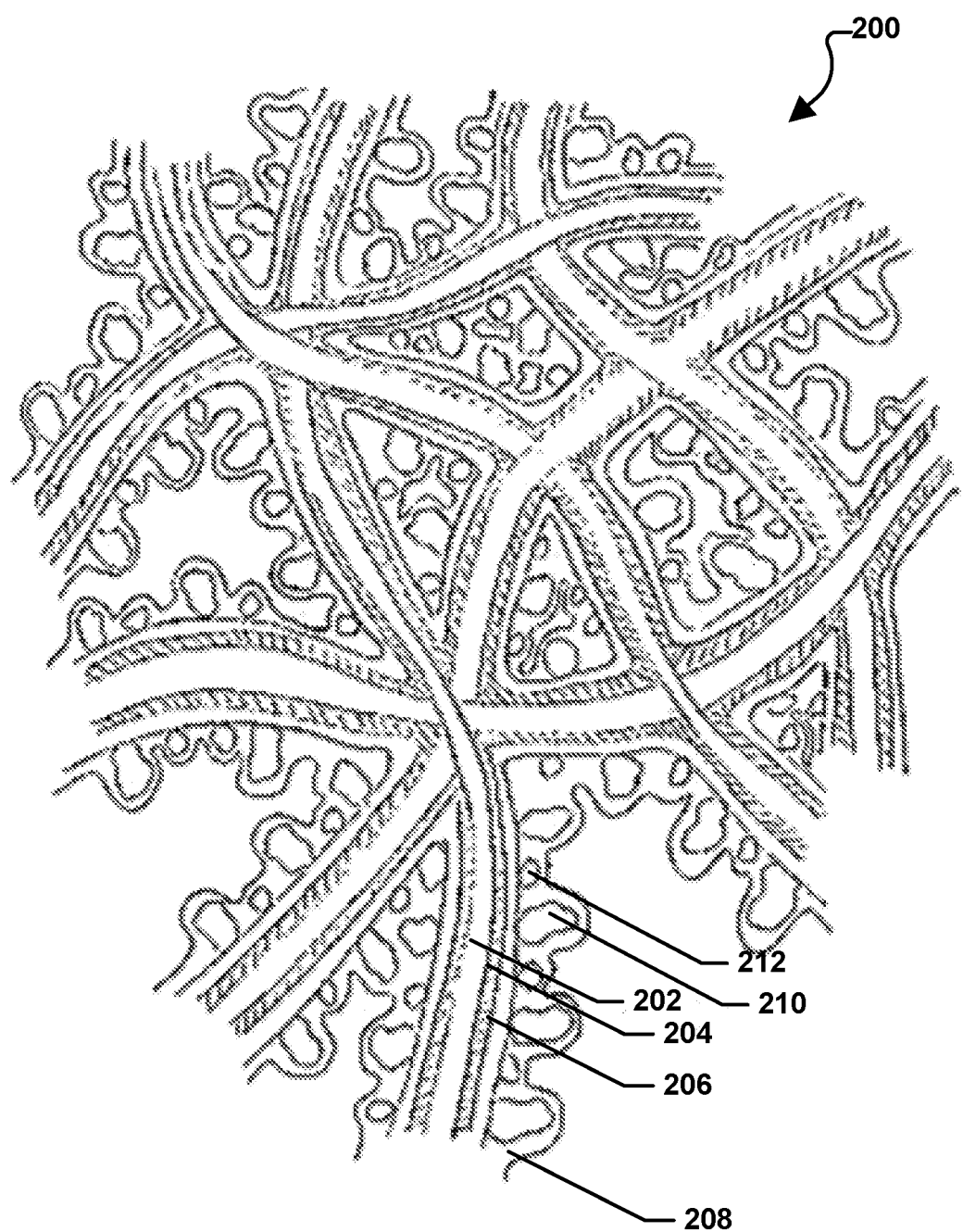
FIG. 2 is an illustration of an enlarged portion of the nonwoven web of FIG. 1 according to an embodiment.

FIG. 2 shows an enlarged portion of the abrasive article of FIG. 1. As is shown in FIG. 2, a first polymeric binder 206 (also called herein a "make coat") composition is disposed on the nonwoven fibers 202 and the blend of abrasive particles (210, 212) is disposed on the first polymeric binder 206. The fibers 202 have an average fiber diameter (Fdia). The blend comprises a plurality of first abrasive particles 210 (also called herein "primary particles" or "primary abrasive particles") having an average particle size ($P1D_{50}$) that is equal to or larger than the average fiber diameter, and a plurality of second abrasive particles 212 (also called herein "reinforcing particles" or "reinforcing abrasive particles") having an average particle size ($P2D_{50}$) that is smaller than the average fiber diameter. A second polymeric binder 208 (also called herein a "size coat") composition is disposed on the blend of abrasive particles and the first binder composition. As in certain embodiments, a third polymeric binder 204 (also called herein a "web binder") composition is disposed on the fibers 202 below first polymeric binder to adhere the fibers together to form the web of lofty nonwoven fibers. Optionally, a fourth polymeric binder (size coat) (not shown) can be disposed over the second polymeric binder 208.

Figure 3:
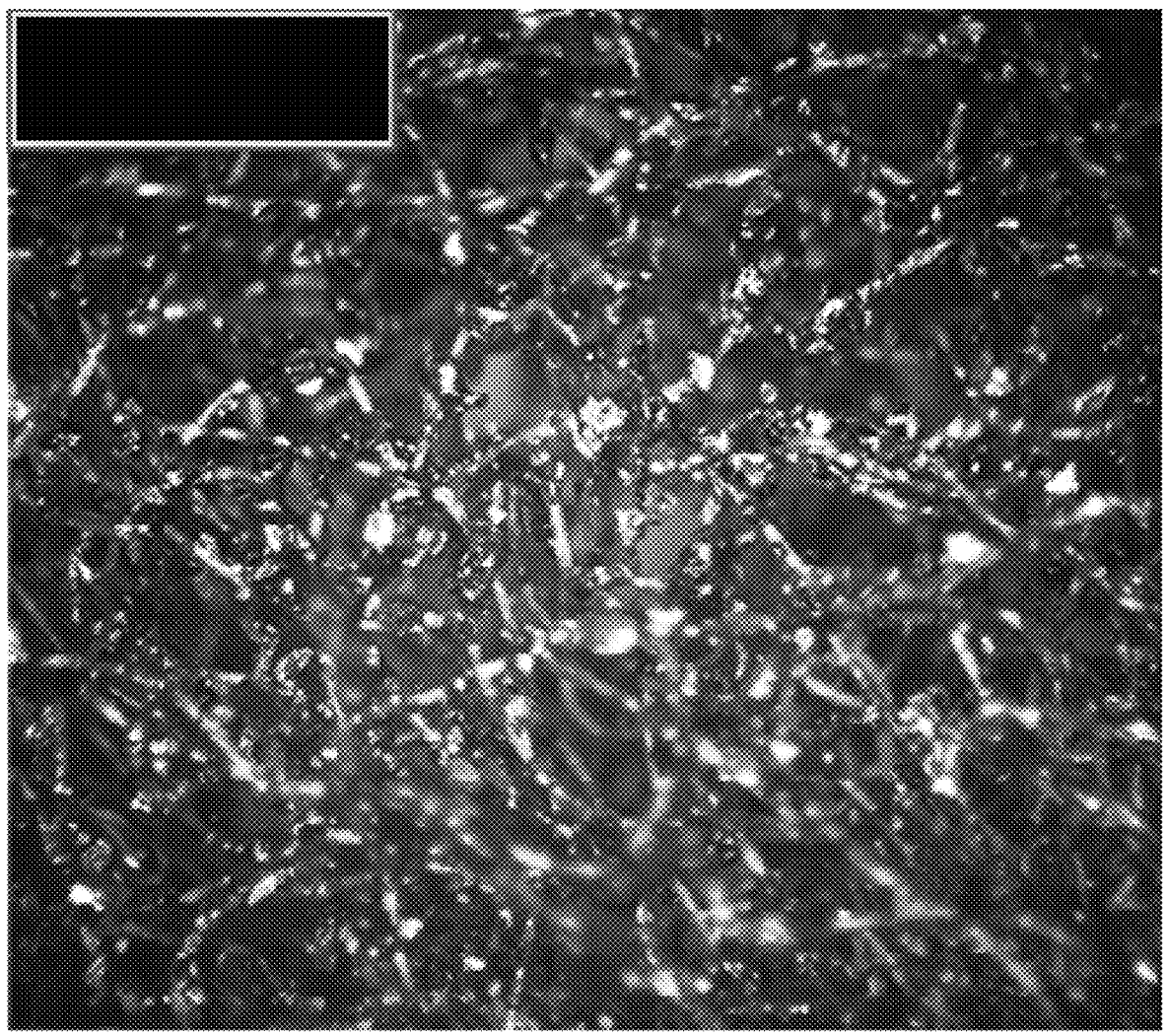
FIG. 3 is a photograph of a nonwoven abrasive according to an embodiment showing a blend of primary and reinforcing abrasive particles disposed on and adhered to the fibers of a nonwoven substrate coated with a binder composition.

FIG. 3 is a photograph of a nonwoven abrasive according to an embodiment showing a blend of 85 wt % primary abrasive particles (ANSI 60) and 15 wt % reinforcing abrasive particles (ANSI 120) disposed on and adhered to the fibers of a nonwoven substrate that is coated with a binder composition.

Figure 4:
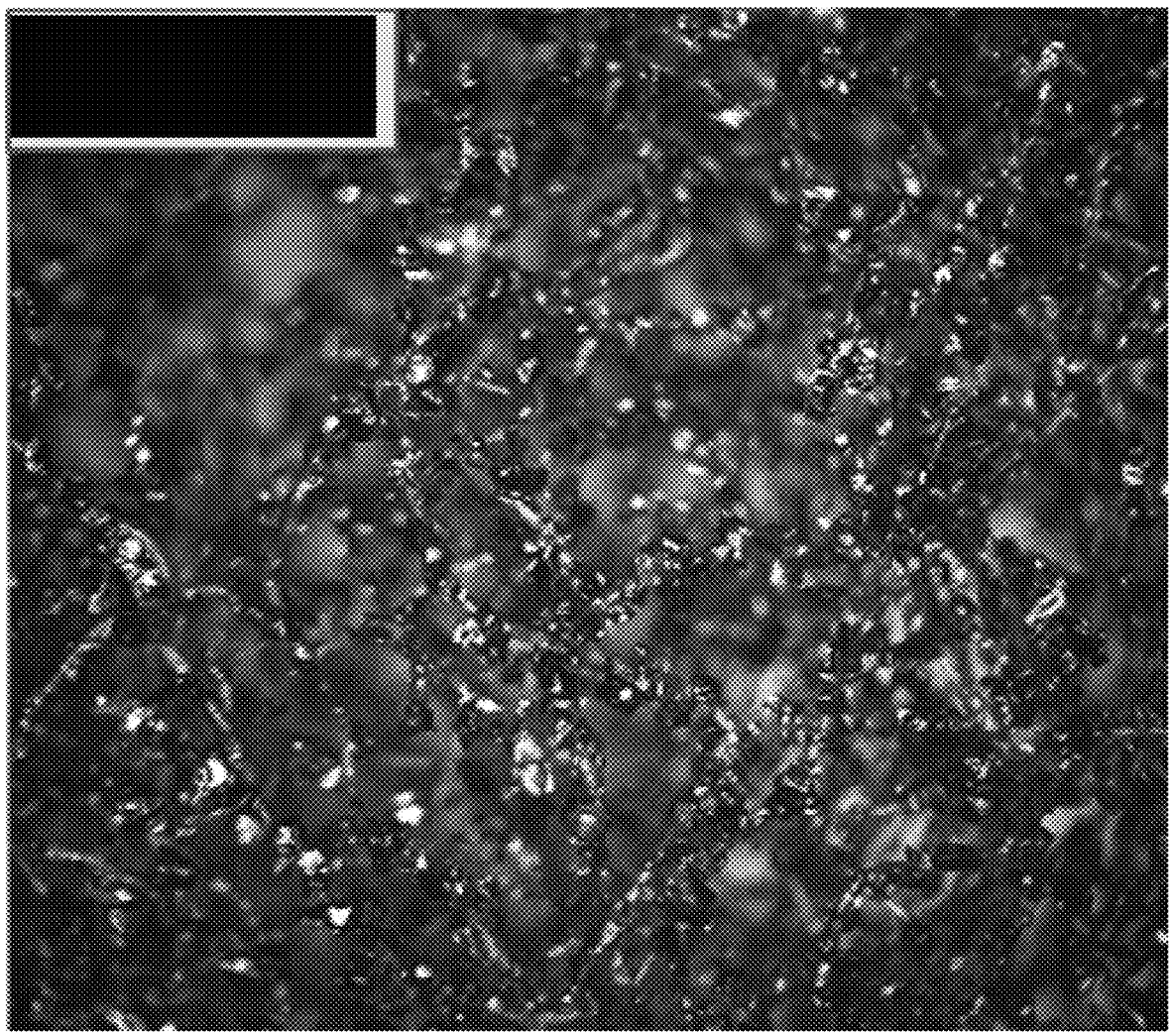
FIG. 4 is a is a photograph of a nonwoven abrasive according to an embodiment showing a blend of primary and reinforcing abrasive particles disposed on nonwoven substrate.

FIG. 4 is a photograph of a nonwoven abrasive according to an embodiment showing a blend of 75 wt % primary abrasive particles (ANSI 60) and 25 wt % reinforcing abrasive particles (ANSI 120) disposed on and adhered to the fibers of a nonwoven substrate that is coated with a binder composition.

Figure 5:
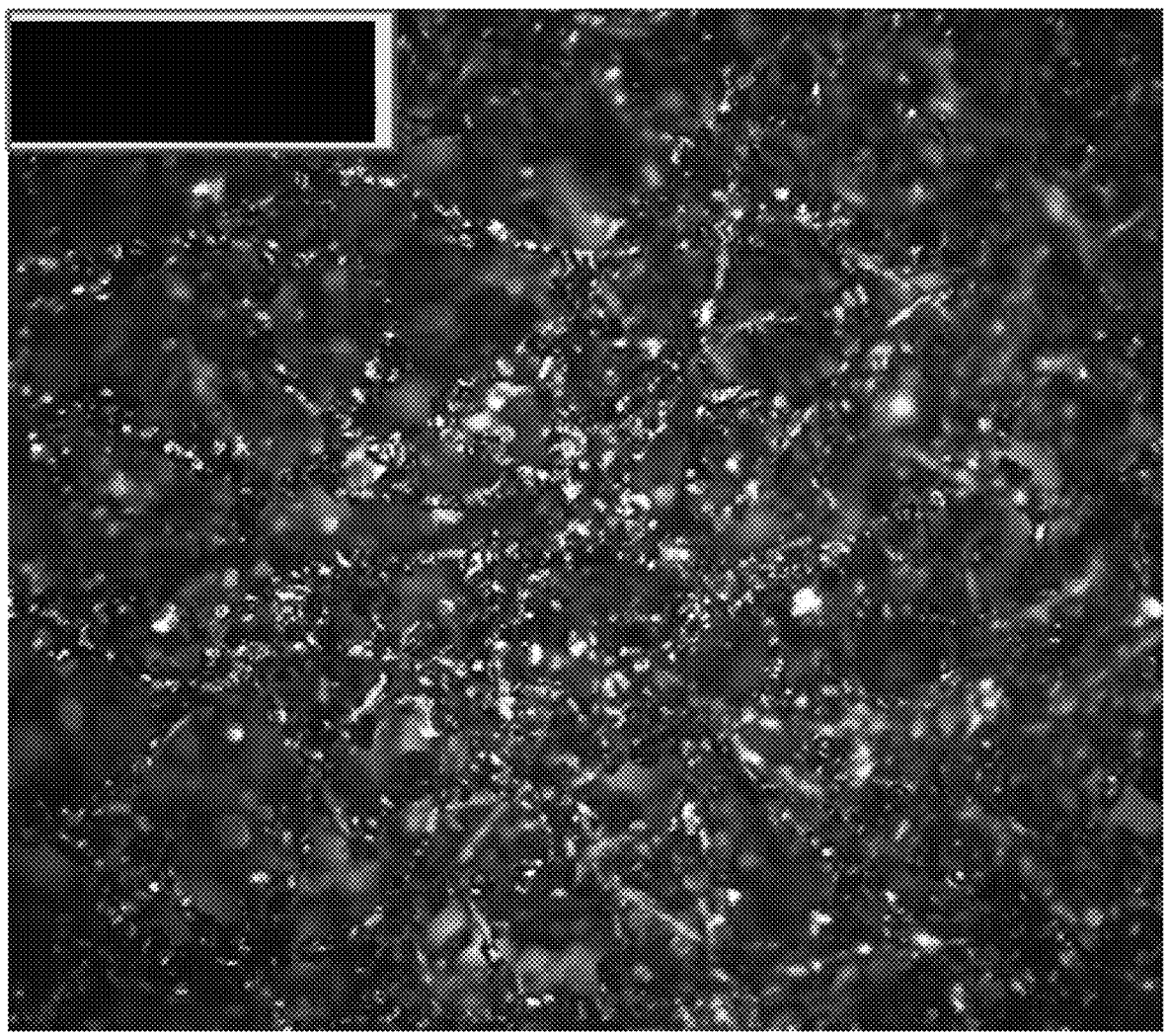
FIG. 5 is a microphotograph of a nonwoven abrasive according to an embodiment showing a blend of primary and reinforcing abrasive particles disposed on nonwoven substrate.

FIG. 5 is a photograph of a nonwoven abrasive according to an embodiment showing a blend of 65 wt % primary abrasive particles (ANSI 60) and 35 wt % reinforcing abrasive particles (ANSI 120) disposed on and adhered to the fibers of a nonwoven substrate that is coated with a binder composition.

Figure 6:
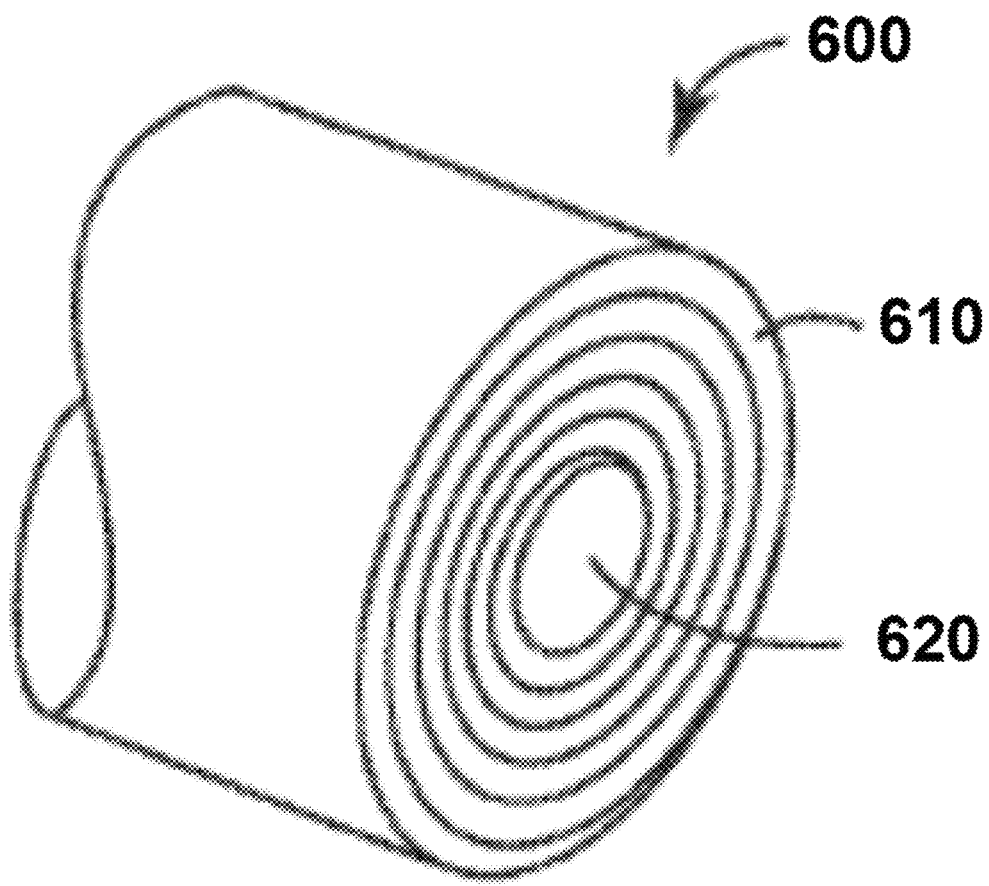
FIG. 6 is an illustration of convolute wheel according to an embodiment.

FIG. 6 is an illustration of a convolute abrasive wheel according to an embodiment.

Figure 7:
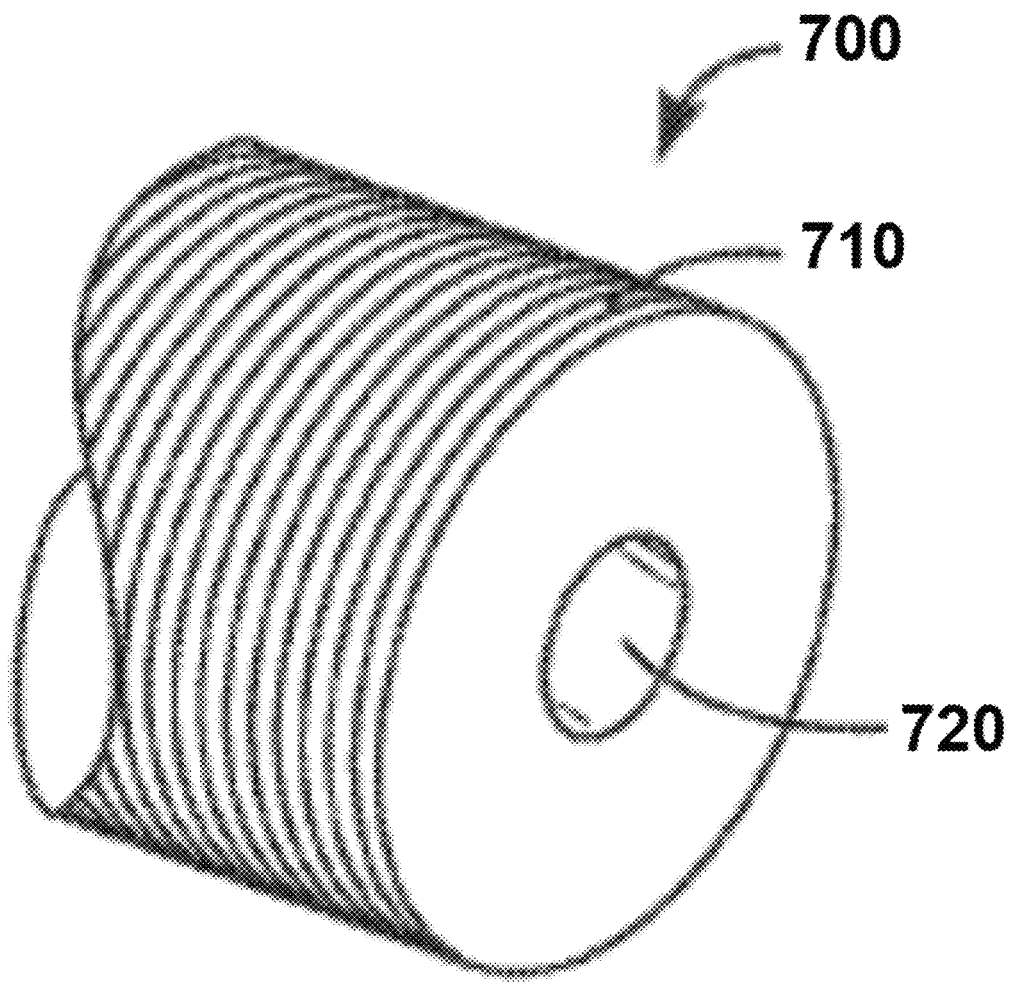
FIG. 7 is an illustration of a unitized wheel according to an embodiment.

FIG. 7 is an illustration of a unified (also called herein a "unitized") abrasive wheel according to an embodiment.

Figure 8:
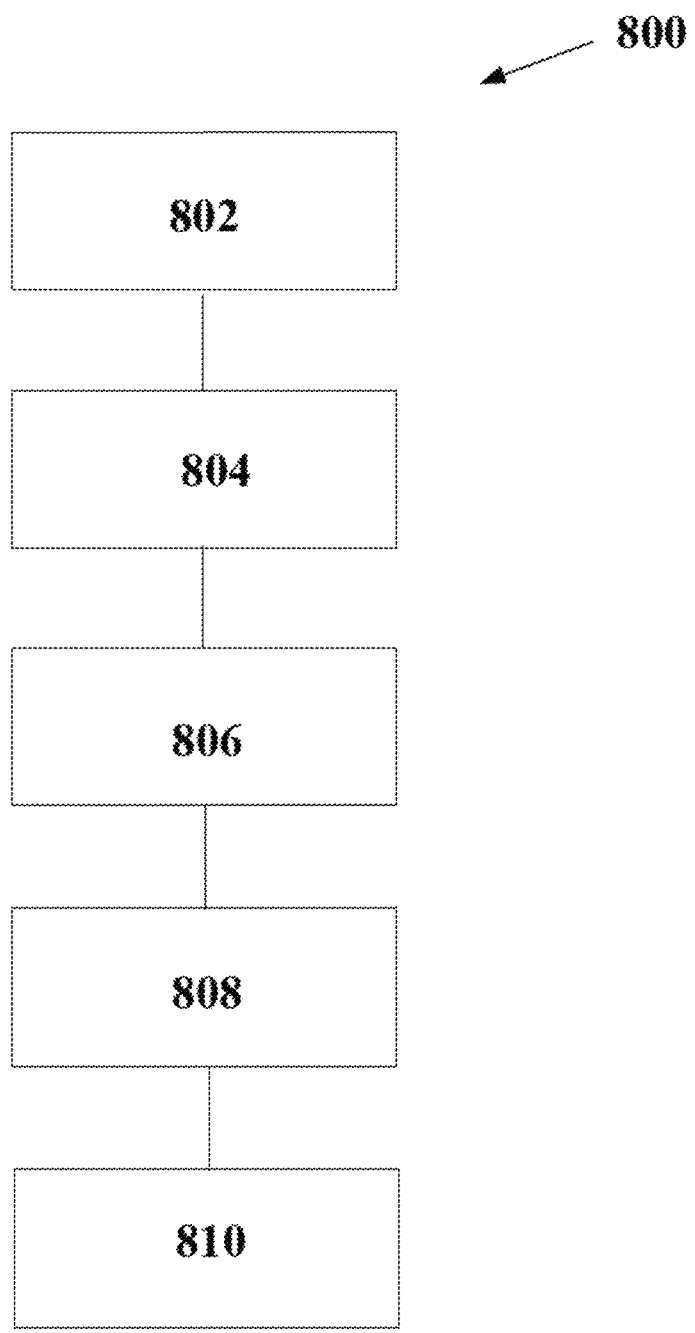
FIG. 8 is a process flow diagram for a method of preparing an abrasive article according to an embodiment.

FIG. 8 is a process flow diagram of a method of making a nonwoven abrasive article according to an embodiment. In step 802, forming a nonwoven fiber web occurs. Forming of the nonwoven fiber web can be accomplished by any suitable technique, such as air laid formation of the fiber web. Forming of the fiber web can include "consolidation" of the fiber web, which can include further steps such as application of a web binder, or optional needling of the fiber web, and curing of the web binder. In step 804, disposing a first polymeric binder precursor (also called herein a "make coat" composition) onto the nonwoven fiber web occurs. In step 806, disposing a blend of primary abrasive particles and reinforcing abrasive particles onto the first binder precursor occurs. An additional coat of polymeric resin can be applied such as by spraying (also referred to herein as a "spray coat") and cured if desired. In step 808, disposing a second polymeric binder precursor (also called a "size coat" composition) onto the blend of abrasive particles and the first binder precursor occurs. In step 810, curing of the size coat occurs. Optionally, a super-size coat, such as a grinding aid or other polymeric formulation can be disposed over the size coat and cured. The cured web can then undergo further processing, such as conversion (i.e., cutting) into any desired shape. Alternatively, the slab can be wound around a central core and then be cut according to known methods in the art to form a convolute wheel, such as is shown in FIG. 6. Alternatively, multiple slabs can be stacked, bound together, and cut according to known methods in the art to form a unified (also called "unitized" wheel), such as is shown in FIG. 7.

The abrasive article can be a unitized abrasive wheel. In an embodiment, the unified wheel discs can be formed from nonwoven abrasive sheets comprising a lofty fiber web bound by a polymer prebond followed by application of a binder precursor and abrasive particles. The nonwoven abrasive sheets are stacked, unitized, and cured under pressure at an elevated temperature to form a "slab." Unified abrasive wheels can then be cut from the slab along with a centered hole for fitting onto the abrasive tool.

The abrasive article can also be a convolute wheel. In an embodiment, the convolute wheels can be formed from a nonwoven abrasive sheet comprising a lofty fiber web bound by a polymer prebond followed by application of a binder precursor and abrasive particles. The sheet is attached to a hollow core and spirally wound around the core to form a rolled cylinder. The core is bound via curing at elevated temperature. Convolute discs can be cut from the edge of the bound cylinder.

Ratio of Particle Size to Fiber Size

The abrasive article comprises a beneficial blend of abrasive particles. The blend comprises a plurality of first abrasive particles (also called herein "primary particles") that have an average particle size ($P1_{D50}$) that is equal to or larger than the average fiber diameter of the nonwoven fibers. The blend further comprises a plurality of second abrasive particles (also called herein "reinforcing particles") that have an average particle size ($P2_{D50}$) that is smaller than the average fiber diameter of the nonwoven fibers.

The abrasive article can have a beneficial ratio of the average primary particle size ($P1_{D50}$) to the average fiber diameter (Fdia). In an embodiment, the ratio of the average primary particle size to the average fiber diameter ($P1_{D50}$:Fdia), can be at least 1.0:1.0, such as at least 1.2:1.0, as at least 1.4:1.0, as at least 1.6:1.0, at least 1.8:1.0, at least 2.0:1.0, at least 2.2:1.0, at least 2.25:1.0, at least 2.4:1.0, at least 2.6:1.0, at least 2.8:1.0, at least 3.0:1.0, at least 3.2:1.0, at least 3.4:1.0, at least 3.6:1.0, at least 3.8:1.0, or at least 4.0:1.0. In another embodiment, the ratio of the average primary particle size to the average fiber diameter ($G1_{D50}$:Fdia) can be not greater than 8.0:1.0, such as not greater than 7.5:1.0, not greater than 7.0:1.0, not greater than 6.5:1.0, not greater than 6.0:1.0, not greater than 5.5:1.0, not greater than 5.0:1.0, not greater than 4.8:1.0, not greater than 4.6:1.0, not greater than 4.4:1.0, not greater than 4.2:1.0, not greater than 4.0:1.0, not greater than 3.8:1.0, not greater than 3.6:1.0, not greater than 3.4:1.0, or not greater than 3.2:1.0. The ratio of the average primary particle size to the average fiber diameter ($P1_{D50}$:Fdia) can be within a range comprising any pair of the previous upper and lower limits. In a particular embodiment, the average primary particle size to the average fiber diameter ($P1_{D50}$:Fdia) ranges from at least at least 1.0:1.0 to not greater than 8.0:1.0, such as at least 1.2:1.0 to not greater than 8.0:1.0.

The abrasive article can have a beneficial ratio of the average reinforcing particle size ($P2_{D50}$) to the average fiber diameter (Fdia). In an embodiment, the ratio of the average reinforcing particle size to the average fiber diameter ($P2_{D50}$:Fdia), can be at least 0.1:1.0, such as at least 0.2:1.0, as at least 0.3:1.0, as at least 0.4:1.0, at least 0.5:1.0, at least 0.6:1.0, or at least 0.65:1.0. In another embodiment, the ratio of the average reinforcing particle size to the average fiber diameter ($G1_{D50}$:Fdia) can be not greater than 0.99:1.0, such as not greater than 0.98:1.0, not greater than 0.97:1.0, not greater than 0.96:1.0. The ratio of the average reinforcing particle size to the average fiber diameter ($P2_{D50}$:Fdia) can be within a range comprising any pair of the previous upper and lower limits. In a particular embodiment, the average reinforcing particle size to the average fiber diameter ($P2_{D50}$:Fdia) ranges from at least 0.1:1.0 to not greater than 0.99:1.0.

Fiber Size

The abrasive article includes a substrate comprising a web of lofty nonwoven fibers. The fibers can have a beneficial average fiber size, such as an average fiber diameter (Fdia). In an embodiment, the average fiber diameter (Fdia) can be at least 10 micrometers, such as at least 20 micrometers, at least 30 micrometers, at least 40 micrometers, at least 50 micrometers, at least 60 micrometers, at least 70 micrometers, at least 80 micrometers, at least 90 micrometers, or at least 100 micrometers. In another embodiment, the average fiber diameter (Fdia) can be not greater than 500 micrometers, such as not greater than 450 micrometers, not greater than 400 micrometers, not greater than 350 micrometers, not greater than 300 micrometers, not greater than 275 micrometers, not greater than 250 micrometers, not greater than 240 micrometers, not greater than 220 micrometers, not greater than 200 micrometers, not greater than 190 micrometers, not greater than 180 micrometers, not greater than 170 micrometers, not greater than 160 micrometers, not greater than 150 micrometers, not greater than 140 micrometers, not greater than 130 micrometers, or not greater than 120 micrometers. The average fiber diameter (Fdia) can be within a range comprising any pair of the previous upper and lower limits. In a particular embodiment, the average fiber diameter (Fdia) ranges from 10 micrometers to 500 micrometers, such as 50 micrometers to 250 micrometers.

Alternatively, the average fiber size can be expressed through average denier, a measure of linear density, which is equal to the mass in grams per 9,000 meters of length of a single filament. For instance, a nylon fiber measuring 200 denier means that 9,000 meters of this fiber weighs 200 grams. In an embodiment, the fibers can have an average linear density of least 1 denier, such as at least 5 denier, at least 10 denier, at least 20 denier, at least 30 denier, at least 40 denier, at least 50 denier, at least 60 denier, at least 70 denier, at least 80 denier, at least 90 denier, at least 100 denier, or at least 110 denier. In another embodiment, the fibers can have an average linear density of not greater than 300 denier, such as not greater than 280 denier, not greater than 260 denier, not greater than 240 denier, not greater than 220 denier, not greater than 200 denier, not greater than 180 denier, not greater than 160 denier, not greater than 140 denier, or not greater than 120 denier. The average linear density can be within a range comprising any pair of the previous upper and lower limits. In a particular embodiment, the average linear density ranges from 1 denier to 2000 denier, such as 40 denier to 250 denier.

Average Particle Sizes

The primary particle can have a beneficial average particle size. In an embodiment, the average primary particle size ($P1_{D50}$)) can be at least 10 micrometers, such as at least 25 micrometers, at least 50 micrometers, at least 75 micrometers, at least 100 micrometers, at least 125 micrometers, at least 150 micrometers, at least 175 micrometers, at least 200 micrometers, at least 225 micrometers, at least 250 micrometers, at least 275 micrometers, or at least 300 micrometers. In another embodiment, the average primary particle size ($P1_{D50}$) can be not greater than 1000 micrometers, such as not greater than 950 micrometers, not greater than 900 micrometers, not greater than 850 micrometers, not greater than 800 micrometers, not greater than 750 micrometers, not greater than 700 micrometers, not greater than 650 micrometers, not greater than 600 micrometers, not greater than 550 micrometers, not greater than 500 micrometers, not greater than 450 micrometers, or not greater than 400 micrometers. The average primary particle size ($P1_{D50}$)) can be within a range comprising any pair of the previous upper and lower limits. In a particular embodiment, the average primary particle size ($P1_{D50}$) ranges from 50 micrometers to 1000 micrometers.

The reinforcing particle can have a beneficial average particle size. In an embodiment, the average reinforcing particle size ($P2_{D50}$) can be at least 5 micrometers, such as at least 10 micrometers, at least 20 micrometers, at least 30 micrometers, at least 40 micrometers, at least 45 micrometers, at least 50 micrometers, at least 65 micrometers, at least 70 micrometers, at least 75 micrometers, at least 80 micrometers, at least 85 micrometers, at least 90 micrometers, at least 95 micrometers, or at least 100 micrometers. In another embodiment, the average reinforcing particle size ($P2_{D50}$) can be not greater than 250 micrometers, such as not greater than 225 micrometers, not greater than 220 micrometers, not greater than 200 micrometers, not greater than 190 micrometers, not greater than 180 micrometers, not greater than 170 micrometers, not greater than 160 micrometers, not greater than 150 micrometers, not greater than 140 micrometers, not greater than 130 micrometers, not greater than 120 micrometers, not greater than 115 micrometers, or not greater than 110 micrometers. The average reinforcing particle size ($P2_{D50}$) can be within a range comprising any pair of the previous upper and lower limits. In a particular embodiment, the average reinforcing particle size ($P2_{D50}$) ranges from 5 micrometers to 250 micrometers.

Abrasive Particle Blend Composition

The abrasive article comprises a beneficial blend of abrasive particles. The blend comprises an amount of a plurality of primary abrasive particles and an amount of a plurality of reinforcing abrasive particles. In an embodiment, the abrasive particle blend can comprise: 0 to 85 wt % of the primary abrasive particles; and 15 to 100 wt % of the reinforcing abrasive particles. In another embodiment, the abrasive particle blend can comprise: 60 to 85 wt % of the primary abrasive particles; and 15 to 40 wt % of the reinforcing abrasive particles. In a particular embodiment, the abrasive particle blend can comprise: 60 to 70 wt % of the primary abrasive particles; and 30 to 40 wt % of the reinforcing abrasive particles.

Solid Volume Fraction

The abrasive article can comprise a beneficial solid volume fraction. In an embodiment, the solid volume fraction can comprise: 1.0% to 40% of the abrasive article; such as 1.1% to 20%, such as 1.2% to 10% of the abrasive article; such as 1.5% to 6%. In a particular embodiment, the solid volume fraction can comprise: 1.3% to 8%, such as 1.5% to 5.5% of the abrasive articles.

Density

The abrasive article can comprise a beneficial density. In an embodiment, the density of the abrasive article can be not less than 0.5 lb./100 in$^3$, such as not less than 0.75 lb./100 in$^3$, not less than 0.9 lb./100 in$^3$, not less than 0.95 lb./100 in$^3$, not less than 1.0 GSM, or not less than 1.05 lb./100 in$^3$. In another embodiment, the weight of the abrasive article can be not greater than 5 lb./100 in$^3$, such as not greater than 4 lb./100 in$^3$, not greater than 3.5 lb./100 in$^3$, not greater than 3.0 lb./100 in$^3$, not greater than 2.5 lb./100 in$^3$, not greater than 2.45 lb./100 in$^3$, not greater than 2.4 lb./100 in$^3$, or not greater than 2.38 lb./100 in$^3$. The weight of the abrasive article can be within a range comprising any pair of the previous upper and lower limits. In a particular embodiment, the weight of the abrasive article ranges from not less than 0.8 lb./100 in$^3$ to not greater than 2.5 lb./100 in$^3$, such as not less than 1 lb./100 in$^3$ to not greater than 1.3 lb./100 in$^3$, or not less than 2 lb./100 in$^3$ to not greater than 2.4 lb./100 in$^3$.

Abrasive Article Composition

The abrasive article can have a beneficial overall composition of components. In an embodiment, the abrasive article can comprise: 30 to 70 wt % abrasive particles (i.e. the blend of abrasive particles); 5 to 35 wt % substrate (i.e., the web of lofty nonwoven fibers); and 25 to 55 wt % total polymeric binder composition (i.e., the sum of the make coat, size coat, and any web binder and/or supersize coat, if present). In another embodiment, the abrasive article can comprise: 30 to 70 wt % abrasive particles; 5 to 35 wt % substrate; 0 to 10 wt % web binder; 5 to 15 wt % make coat; 20 to 40 wt % size coat, and 0 to 15 wt % supersize.

Abrasive Particles Composition

The reinforcing abrasive particles can be the same as or different than, the primary abrasive particle with respect to chemical composition, structure, shape, and/or surface treatment. Thus, the distinction between the primary abrasive particle and the reinforcing abrasive particle is based on average particle size, particularly in relation to the average size of the fibers of the nonwoven web substrate. Therefore, it will be understood that the below references to "abrasive particles" apply to both the "primary abrasive particle" as well as the "reinforcing abrasive particle."

Abrasive particles can be individual particles or agglomerate particles. Abrasive particles can comprise any one of or a combination of abrasive materials, including silica, alumina (fused or ceramic), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive particles may be selected from a group consisting of silica, alumina, zirconia, silicon carbide, silicon nitride, boron nitride, garnet, diamond, co-fused alumina zirconia, ceria, titanium diboride, boron carbide, flint, emery, alumina nitride, combinations thereof, and blends thereof.

In a particular embodiment, the abrasive particles can include silicon carbide, aluminum oxide, or a combination thereof.

In a particular embodiment, the abrasive particles can include aluminum oxide abrasive particles produced by a fusion process (commonly known as "ALO" abrasive particles or "fused aluminum oxide" abrasive particles). ALO abrasive particles include alumina zirconia fusion abrasive particles, Brown friable aluminum oxide abrasive particles, semi-friable aluminum oxide abrasive particles, and white friable aluminum oxide abrasive particles. ALO abrasive particles can be heat treated to alter the physical and abrasive performance properties of the abrasive particles. Such heated treated ALO abrasive particles are commonly referred to as "heat treated" versions of the particles (e.g., heat treated brown friable aluminum oxide abrasive particles).

In a particular embodiment, the abrasive particles can include ceramic abrasive particles, such as ceramic aluminum oxide abrasive particles. Ceramic aluminum oxide abrasive particles (also called sol-gel aluminum oxide) may be produced by sol-gel formation processes. Sol-gel processes include seeded gel alumina formation processes. Seeded gel alumina abrasive particles are ceramic aluminum oxide particles manufactured by a sintering process and have a very fine microstructure. Seeded-gel abrasive particles tend to stay sharper than conventional abrasive particles, which can dull as flats are worn on the working points of the abrasive grits. Ceramic aluminum oxide particles include ceramic aluminum oxide shaped abrasive particles, ceramic aluminum oxide crushed abrasive particles, and ceramic aluminum oxide exploded particles. Ceramic abrasive particles can be doped ceramic abrasive particles or undoped (i.e., not doped) ceramic abrasive particles. Doped abrasive particles can be doped in vary amounts.

The abrasive particles can have a particular shape, such as a rod, a triangle, a pyramid, a cone, a solid sphere, a hollow sphere, or the like. Alternatively, the abrasive particles may be randomly shaped.

In one embodiment the abrasive particles can be surface treated. In an embodiment, the primary abrasive particles can be silylated. In another embodiment, the surface treatment can be done by a coupling agent. The coupling agent can be a silane containing coupling agent selected from an aminoalkylsilane, an isocyanatosilane, a chloroalkysilane, or any combination thereof.

Nonwoven Substrate Composition

In an embodiment, the nonwoven substrate material is a three-dimensional nonwoven open web material formed of lofty staple fibers. The staple fibers can be bound together by one or more binder coating compositions (web binder). Alternately, the web can be formed autogenously without the need for a web binder, such as by melt bonding. Melt bonding can include using a combination of low-melt and high-melt fibers that are melted together to form a bond. In another alternative, mechanical bonding of the fibers can be achieved by needling, carding, or a combination thereof. The staple fibers can be the same or different and can comprise a blend of fibers having differing linear density, such as a blend of linear densities.

The nonwoven substrate material can have a particular mass per unit area, such as g/m$^2$ (GSM), commonly called the "weight" of the nonwoven material. In an embodiment, the weight of the nonwoven material can be not less than 75 GSM, such as not less than 80 GSM, not less than 100 GSM, not less than 150 GSM, not less than 200 GSM, not less than 250 GSM, not less than 300 GSM, or not less than 350 GSM. In another embodiment, the weight of the nonwoven material can be not greater than 750 GSM, such as not greater than 700 GSM, not greater than 650 GSM, not greater than 600 GSM, not greater than 550 GSM, not greater than 500 GSM, not greater than 450 GSM, not greater than 400 GSM, or not greater than 390 GSM. The weight of the nonwoven material can be within a range comprising any pair of the previous upper and lower limits. In a particular embodiment, the weight of the nonwoven material ranges from not less than 50 GSM to not greater than 750 GSM, such as not less than 80 GSM to not greater than 700 GSM.

The fibers of the nonwoven web can be an organic material, an inorganic material, a natural material, a semi-synthetic material, a synthetic material, or a combination thereof. The fibers can be flexible, rigid, or a combination thereof. The fibers can comprise a single type of fiber or a plurality of different types of fibers. The fibers can comprise banana fibers, cellulose fibers, cotton fibers, flax fibers, hemp fibers, jute fibers, kenaf fibers, sisal fibers, viscose fibers, rayon fibers, poly-cotton fibers, carbon fibers, polyaramid fibers (e.g., Kevlar®, Twaron®), polyamide fibers (Nylon 6 (poly(hexano-6-lactam)); Nylon 6,6 (Poly[imino (1,6-dioxohexamethylene) iminohexamethylene]), polyamine fibers, polyester fibers, polyethylene fibers, polyimide fibers, polypropylene fibers, glass fibers, metal fibers, ceramic fibers, or combinations thereof. The fibers can comprise virgin fibers or recycled fibers.

The fibers of the nonwoven web can vary in length. In an embodiment, the length of the fibers can be not less than 10 mm, such as not less than 20 mm, not less than 30 mm, not less than 40 mm, or not less than 45 mm. In another embodiment, the length of the fibers can be not greater than 90 mm, such as not greater than 80 mm, not greater than 70 mm, not greater than 60 mm, not greater than 50 mm, or not greater than 45 mm. The length of the fibers can be within a range comprising any pair of the previous upper and lower limits. In a particular embodiment, the length of the fibers ranges from not less than 10 mm to not greater than 90 mm.

First Binder Composition—Make Coat

In a particular aspect, the first polymeric binder composition 206 (commonly known as the make coat) can be formed of a single polymer or a blend of polymers. The first binder composition can be formed from an epoxy composition, acrylic composition, a phenolic composition, a polyurethane composition, a urea formaldehyde composition, a polysiloxane composition, or combinations thereof. In addition, the binder composition can include active filler particles, additives, or a combination thereof, as described herein.

The first binder composition generally includes a polymer matrix, which binds abrasive particles to the backing or to a compliant coat, if such a compliant coat is present. Typically, the first binder composition can be formed of cured binder formulation. In an embodiment, the first binder formulation includes a polymer component and a dispersed phase.

The first binder composition can include one or more reaction constituents or polymer constituents for the preparation of a polymer. A polymer constituent can include a monomeric molecule, a polymeric molecule, or a combination thereof. The first binder formulation can further comprise components selected from the group consisting of solvents, plasticizers, chain transfer agents, catalysts, stabilizers, dispersants, curing agents, reaction mediators and agents for influencing the fluidity of the dispersion.

The polymer constituents can form thermoplastics or thermosets. By way of example, the polymer constituents can include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents can typically be curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The binder formulation can include a monomer, an oligomer, a polymer, or a combination thereof. In a particular embodiment, the binder formulation includes monomers of at least two types of polymers that when cured can crosslink. For instance, the binder formulation can include epoxy constituents and acrylic constituents that when cured form an epoxy/acrylic polymer.

In an embodiment, the make coat comprises no filler. In another embodiment, the make coat can comprises filler particles. In a specific embodiment, the make coat comprises a polymeric phenolic composition, a polymeric polyester composition, or a combination thereof. In a specific embodiment, the make coat comprises a polymeric phenolic and polyester composition. In a specific embodiment, the make coat comprises a polymeric polyester composition.

Second Binder—Size Coat

As described above, the abrasive article 100 can comprise a second binder composition 208 (size coat) disposed on the first binder composition 206 (make coat) and the blend of abrasive particles (210, 212). The second binder composition 208 can be the same as or different from the first binder composition. The second binder composition can include one or more additives or fillers.

In an embodiment, the second binder composition (size coat) comprises no filler. In another embodiment, the size coat can comprise filler particles. In a specific embodiment, the size coat comprises a polymeric phenolic composition, a polymeric polyester composition, a polymeric epoxy composition, or a combination thereof. In a specific embodiment, the size coat comprises a polymeric epoxy and polyester composition. In a specific embodiment, the make coat comprises a polymeric polyester composition.

Third Binder—Web Binder

As described above, the abrasive article 100 can comprise a third binder composition 204 (web binder) disposed on the fibers 202 under the first binder composition 206 (make coat). The third binder composition 202 can be the same as or different from the first binder composition and the second binder composition. The third binder composition can include one or more additives or fillers.

In an embodiment, the third binder composition (web binder) comprises no filler. In another embodiment, the size coat can comprise filler particles. In a specific embodiment, the web binder comprises a polymeric acrylic composition, such as a latex acrylic composition, a polymeric melamine formaldehyde composition, or a combination thereof.

Fourth Binder Composition—Supersize Coat

As previously described, the abrasive article 100 can optionally comprise a supersize coat (not shown) disposed on the size coat 208. The supersize coat can be the same as or different from the make coat 206 and the size coat 208 disposed thereon. In another aspect, the supersize coat can comprise a stearate, such as a metal stearate, such as zinc stearate.

Fifth Binder Composition—Spray Mix

As previously described, the abrasive article 100 can optionally comprise a spray mix composition (not shown) disposed on the make coat 206. Alternatively, the spray mix can be applied over the make coat when the make coat has not yet been cured, which can produce mixed phase (somewhat to fully interspersed) or separate phase (separate layers) when cured. The spray mix can be the same as or different from the make coat 206 and the size coat 208. In a specific embodiment, the spray mix comprises a polymeric acrylic composition, such as a latex acrylic composition, a polymeric melamine formaldehyde composition, or a combination thereof.

Additives

In a particular aspect, the first binder composition 206 (make coat), the second binder composition 208 (size coat), or the supersize coat layer 122 can include one or more additives. Suitable additives, for example, can include grinding aids, fibers, lubricants, wetting agents, thixotropic materials, surfactants, thickening agents, pigments, dyes, antistatic agents, coupling agents, plasticizers, suspending agents, pH modifiers, adhesion promoters, lubricants, bactericides, fungicides, flame retardants, degassing agents, anti-dusting agents, dual function materials, initiators, chain transfer agents, stabilizers, dispersants, reaction mediators, colorants, and defoamers. The amounts of these additive materials can be selected to provide the properties desired. These optional additives can be present in any part of the overall system of the coated abrasive product according to embodiments of the present disclosure. Suitable grinding aids can be inorganic based; such as halide salts, for example cryolite, wollastonite, and potassium fluoroborate; or organic based, such as sodium lauryl sulphate, or chlorinated waxes, such as polyvinyl chloride. In an embodiment, the grinding aid can be an environmentally sustainable material.

EMBODIMENTS

Embodiment 1

An abrasive article comprising:
a substrate comprising a web of lofty nonwoven fibers;
a first polymeric binder ("make") composition disposed on the nonwoven fibers; and
a blend of abrasive particles disposed on the polymeric binder,
wherein the fibers have an average fiber diameter (Fdia),
wherein the blend comprises a plurality of first abrasive particles ("primary particles") having an average particle size ($P1_{D50}$) that is equal to or larger than the average fiber diameter, and
wherein the blend comprises a plurality of second abrasive particles ("reinforcing particles") having an average particle size ($P2_{D50}$) that is smaller than the average fiber diameter.

Embodiment 2

The abrasive article of embodiment 1, further comprising a second polymeric binder ("size coat") disposed on the blend of abrasive particles and the fibers.

Embodiment 3

The abrasive article of embodiment 2, further comprising a third polymeric binder ("web binder") disposed on the fibers and adhering the fibers together to form the web of lofty nonwoven fibers, wherein the third polymeric binder is disposed between the fibers and the first polymeric binder ("make") composition.

Embodiment 4

The abrasive article of embodiment 1, wherein the ratio of the average primary particle size ($P1_{D50}$) to the average fiber diameter (Fdia) is at least 1.0:1.0.

Embodiment 5

The abrasive article of embodiment 1, wherein the ratio of the average primary particle size ($P1_{D50}$) to the average fiber diameter (Fdia) is not greater than 8.0:1.0.

Embodiment 6

The abrasive article of embodiment 1, wherein the ratio of the average primary particle size ($P1_{D50}$) to the average fiber diameter (Fdia) is in a range from 1.0:1.0 to 8.0:1.0.

Embodiment 7

The abrasive article of embodiment 1, wherein the ratio of the average reinforcing particle size ($P2_{D50}$) to the average fiber diameter (Fdia) is at least 0.1:1.0.

Embodiment 8

The abrasive article of embodiment 1, wherein the ratio of the average reinforcing particle size ($P2_{D50}$) to the average fiber diameter (Fdia) is not greater than 0.99:1.0.

Embodiment 9

The abrasive article of embodiment 1, wherein the ratio of the average reinforcing particle size ($P2_{D50}$) to the average fiber diameter (Fdia) is in a range from 0.1:1.0 to 0.99:1.0.

Embodiment 10

The abrasive article of embodiment 1, wherein the average fiber diameter (Fdia) is at least 10 micrometers.

Embodiment 11

The abrasive article of embodiment 1, wherein the average fiber diameter (Fdia) is not greater than 500 micrometers.

Embodiment 12

The abrasive article of embodiment 1, wherein the average fiber diameter (Fdia) ranges from 10 micrometers to 500 micrometers.

Embodiment 13

The abrasive article of embodiment 1, wherein the average fiber diameter (Fdia) is at least 1 denier.

Embodiment 14

The abrasive article of embodiment 1, wherein the average fiber diameter (Fdia) is not greater than 300 denier.

Embodiment 15

The abrasive article of embodiment 1, wherein the average fiber diameter (Fdia) ranges from 1 denier to 300 denier.

Embodiment 16

The abrasive article of embodiment 1, wherein the average primary particle size ($P1_{D50}$) is at least 30 micrometers.

Embodiment 17

The abrasive article of embodiment 1, wherein the average primary particle size ($P1_{D50}$) is not greater than 1000 micrometers.

Embodiment 18

The abrasive article of embodiment 1, wherein the average primary particle size ($P1_{D50}$) ranges from 30 micrometers to 1000 micrometers.

Embodiment 19

The abrasive article of embodiment 1, wherein the average reinforcing particle size ($P2_{D50}$) is at least 5 micrometers.

Embodiment 20

The abrasive article of embodiment 1, wherein the average reinforcing particle size ($P1_{D50}$) is not greater than 250 micrometers.

Embodiment 21

The abrasive article of embodiment 1, wherein the average reinforcing particle size ($P1_{D50}$) ranges from 5 micrometers to 250 micrometers.

Embodiment 22

The abrasive article of embodiment 1, wherein the abrasive particle blend comprises:
0 to 85 wt % of the primary abrasive particle; and
15 to 100 wt % of the reinforcing abrasive particle.
23. The abrasive article of claim 1, wherein the abrasive particle blend comprises
60 to 85 wt % of the primary abrasive particle; and
15 to 40 wt % of the reinforcing abrasive particle.

Embodiment 23

The abrasive article of embodiment 1, wherein the abrasive article comprises:
30 to 70 wt % abrasive particles (i.e. the blend of abrasive particles); 5 to 35 wt % substrate (i.e., the web of lofty nonwoven fibers); and 25 to 55 wt % total polymeric binder composition (i.e., the sum of the make coat, size coat, and any web binder and/or supersize coat, if present).

Embodiment 24

The abrasive article of embodiment 3, wherein the abrasive article comprises:
30 to 70 wt % abrasive particles (i.e. the blend of abrasive particles);
5 to 35 wt % substrate (i.e., the web of lofty nonwoven fibers);
0 to 10 wt % web binder;
5 to 15 wt % make coat;
20 to 40 wt % size coat, and
0 to 15 wt % supersize.

Embodiment 25

The abrasive article of embodiment 1, wherein the primary abrasive particle comprises alumina, alumina zirconia, silicon carbide, cubic boron nitride, diamond, or a combination thereof.

Embodiment 26

The abrasive article of embodiment 1, wherein the composition of the reinforcing abrasive particle is the same as the composition of the primary abrasive particle.

Embodiment 27

The abrasive article of embodiment 1, wherein the fibers comprise banana fibers, cellulose fibers, cotton fibers, flax fibers, hemp fibers, jute fibers, kenaf fibers, sisal fibers, viscose fibers, rayon fibers, poly-cotton fibers, carbon fibers, polyaramid fibers (e.g., Kevlar®, Twaron®), polyamide fibers (Nylon 6 (poly(hexano-6-lactam)); Nylon 6,6 (Poly[imino(1,6-dioxohexamethylene) iminohexamethylene]), polyamine fibers, polyester fibers, polyethylene fibers, polyimide fibers, polypropylene fibers, glass fibers, metal fibers, ceramic fibers, or combinations thereof.

Embodiment 28

The abrasive article of embodiment 1, wherein the substrate is air laid.

Embodiment 29

The abrasive article of embodiment 1, wherein the fibers are staple fibers having a length ranging from 10-90 mm.

Embodiment 30

The abrasive article of embodiment 1, wherein the substrate has a weight of 80-700 GSM (6-46 lb/ream).

Embodiment 31

A method of making an abrasive article comprising:
forming a web of lofty nonwoven fibers;
disposing a first polymeric binder precursor on the web;
disposing a blend of primary abrasive particles and reinforcing abrasive particles onto the first binder precursor occurs;
disposing a second polymeric binder precursor onto the blend of abrasive particles and the first binder precursor; and
curing the binder precursors to form the abrasive article.

Embodiment 32

The method of embodiment 31, wherein the blend of primary abrasive particles and reinforcing abrasive particles is formed by mixing together a plurality of primary abrasive particles and a plurality reinforcing abrasive particles.

Embodiment 33

The method of embodiment 32, wherein disposing the blend comprises disposing by gravity.

Embodiment 34

The abrasive article of embodiment 1, wherein the abrasive article comprises a convolute abrasive wheel, a unified abrasive wheel, or an abrasive hand pad.

EXAMPLES

A. Abrasive Blend Preparation

Sample blends of abrasive particles were prepared by mixing together pluralities of two abrasive particles. The sample blends and Controls are described below in Table 1. Grit size ANSI 60 equals 250 micron diameter and ANSI 120 equals 106 micron diameter.

TABLE 1

Sample Abrasive Particle Blends

| Sample Name | Particle 1 (Primary Abrasive Particle) | Particle 2 (Reinforcing Abrasive Particle) |
| --- | --- | --- |
| Control | 100 wt % ANSI 60 | 0 wt % ANSI 120 |
| S1 | 85 wt % ANSI 60 | 15 wt % ANSI 120 |
| S2 | 75 wt % ANSI 60 | 25 wt % ANSI 120 |
| S3 | 65 wt % ANSI 60 | 35 wt % ANSI 120 |
| S4 | 0 wt % ANSI 60 | 100 wt % ANSI 120 |

B. Abrasive Wheel Preparation

A nonwoven substrate (lofty nonwoven fibers) was provided. The nonwoven substrate comprised a substrate of air-laid (Rando-Webber machine), polyamide (Nylon 6,6), 0.5 to 2.5 inch length staple fibers having a 111 micron avg. dia. and an average linear density of 100 denier. The air-laid fibers of the nonwoven web were bound together with an acrylic web binder composition. The nonwoven substrate was porous and flexible, having a uniform fabric weight (fiber weight plus web binder weight): 200-300 gsm and had a solid volume fraction (SVF) ranging from of 1.5 to 3.5.

A polymeric make coat binder composition (polyurethane composition) was disposed onto and throughout the nonwoven web. The blend of abrasive particles (S1), as described above, was disposed onto the make coat and fibers of the nonwoven web by gravity coating. Notably, even though the abrasive particle deposition was accomplished by gravity coating, there was no noticeable separation of coarse-fine abrasive particle (i.e., the blend of abrasive particles was well dispersed on and throughout the web).

A polymeric spray mixture composition (phenolic composition) was applied over the make coat and abrasive particles. The make coat and spray mixture composition were then cured.

A size coat composition (polyurethane composition) was then applied over the spray mixture composition. The size coat composition was then cured, thus forming a completed single layer sheet nonwoven abrasive article. The coated web was passed through an oven, curing the make and size coats and forming a completed single layer sheet nonwoven abrasive article.

The single layer sheet of nonwoven abrasive was then formed into a convolute abrasive wheel by coating both sides of the nonwoven abrasive sheet with an adhesive composition (epoxy composition), winding the nonwoven abrasive sheet around a central core (a "hub") in a spiral manner, curing the adhesive, and then slicing to form a convolute abrasive wheel.

The process described above for the S1 abrasive wheel was repeated to construct abrasive wheels for each of the abrasive particle blends: Control, S2, S3, and S4. The only difference between the abrasive wheels was the composition of the abrasive particle blend.

C. Abrasive Performance Testing

Figure 9:
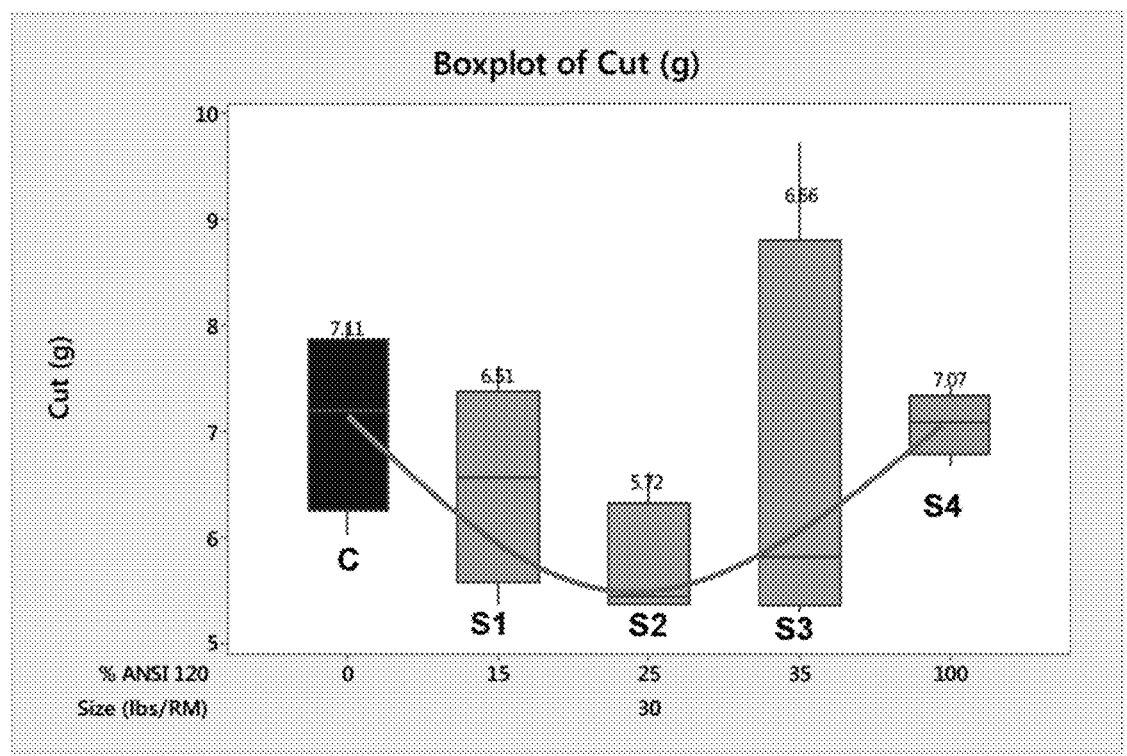
FIG. 9 is box plot graph showing the material removed from work pieces ("Cut") by sample embodiments and control abrasive articles.
Figure 10:
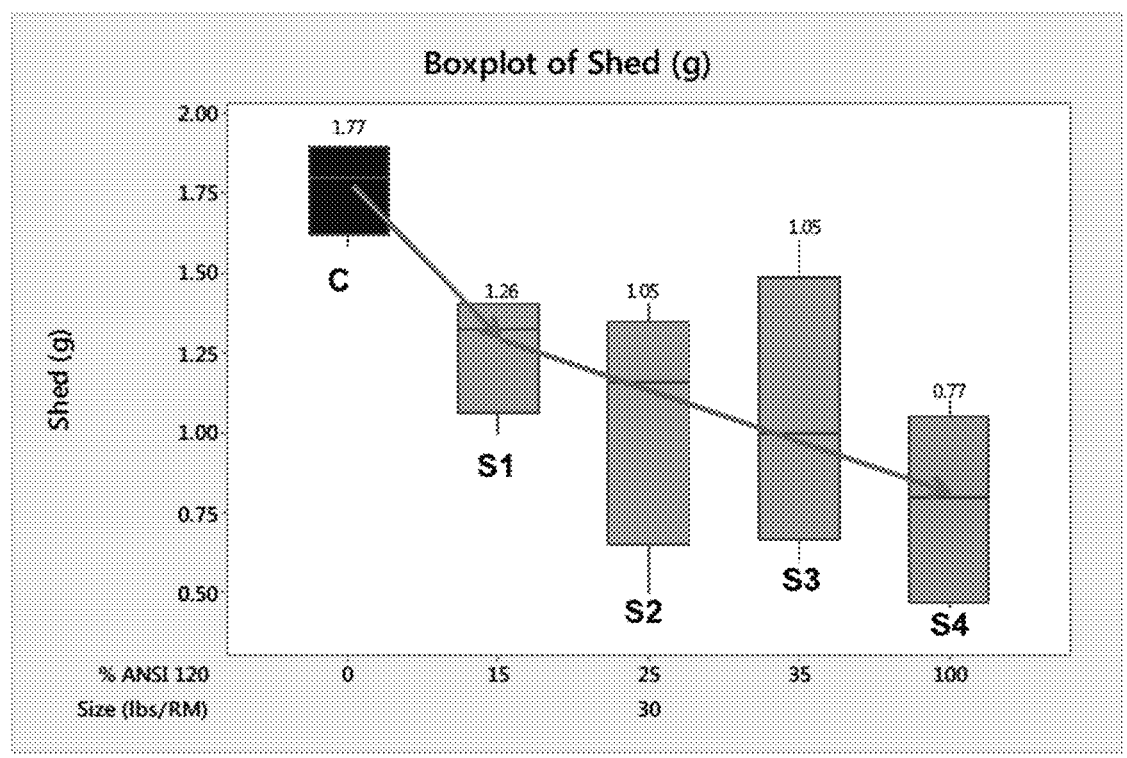
FIG. 10 is box plot graph showing the material lost ("Shed") from the sample embodiments and control abrasive articles.
Figure 11:
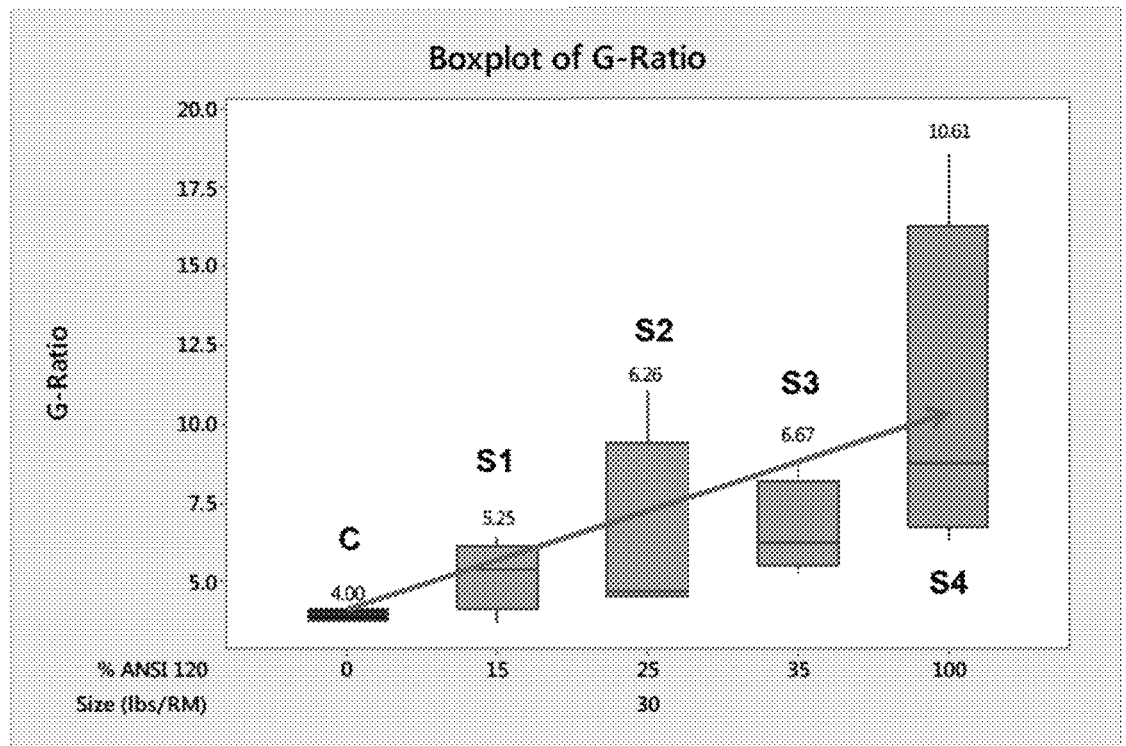
FIG. 11 is box plot graph showing the Grind Ratio ("G-Ratio") of the sample embodiments and control abrasive articles.

The Control abrasive wheel (Control) and the Sample abrasive wheels S1, S2, S3, and S4 were used to conduct abrasive performance testing. Low pressure (7 lb. dead weight) off hand grinding was conducted at 2700 rpm for 10 min cycles on steel test workpieces. The total amount of material removed from the workpiece (Average cut), total amount of material lost from the abrasive wheel (Average shed), and grind ratio (Average cut/Average shed) were recorded. The testing results are shown below in Table 2 and in FIG. 9-11.

TABLE 2

Abrasive Performance Results

| Sample Name | Avg. Cut (g) | Avg. Shed (g) | Grind Ratio | Grind Ratio relative to Control 1 |
| --- | --- | --- | --- | --- |
| Control 1 100 wt % ANSI 60 | 7.11 | 1.77 | 4.00 | 100% |
| S1 85 wt % ANSI 60 15 wt % ANSI 120 | 6.51 | 1.26 | 5.25 | 131% |
| S2 75 wt % ANSI 60 25 wt % ANSI 120 | 5.72 | 1.05 | 6.25 | 156% |
| S3 65 wt % ANSI 60 35 wt % ANSI 120 | 6.66 | 1.05 | 6.67 | 167% |
| S4 100 wt % ANSI 120 | 7.07 | 0.77 | 10.61 | 265% |

Surprisingly, the trend in average total cut does not correlate with the percentage of smaller sized reinforcing abrasive particle (% ANSI 120) in the blend. Instead, as is shown by the trend line (FIG. 9), although the cut initially drops for S1 and S2, the average cut then surprisingly increases for S3 and S4. Further, the average shed and percentage of smaller sized reinforcing abrasive particles show an indirect relationship. Again surprisingly, the grind ratio for all samples S1-S4 was greater than for the Control. The grind ratio relative to the Control for the samples varied from a low of 129% for S1 to a high of 265% for S4.

2A. Additional Abrasive Blend Preparations

Additional sample blends of silicon carbide abrasive particles were prepared by mixing together pluralities of two different size silicon carbide abrasive particles. The Sample blends and Controls are described below in Table 3. ANSI grit size and equivalent average diameter in micrometers are shown.

TABLE 3

Sample Abrasive Particle Blends

| Sample Name | Particle 1 (Primary Abrasive Particle) | Particle 1 (μm) | Particle 2 (Reinforcing Abrasive Particle) | Particle 2 (μm) |
|---|---|---|---|---|
| Control 2 | 65 wt % ANSI 46 | 355 | 35 wt % ANSI 46 | 355 |
| S5 | 65 wt % ANSI 46 | 355 | 35 wt % ANSI 120 | 106 |
| S6 | 65 wt % ANSI 46 | 355 | 35 wt % ANSI 150 | 75 |
| S7 | 65 wt % ANSI 46 | 355 | 35 wt % ANSI 240 | 45 |
| Control 3 | 65 wt % ANSI 60 | 250 | 35 wt % ANSI 60 | 250 |
| S8 | 65 wt % ANSI 60 | 250 | 35 wt % ANSI 120 | 106 |
| S9 | 65 wt % ANSI 60 | 250 | 35 wt % ANSI 150 | 75 |
| S10 | 65 wt % ANSI 60 | 250 | 35 wt % ANSI 240 | 45 |
| Control 4 | 65 wt % ANSI 80 | 180 | 35 wt % ANSI 80 | 180 |
| S11 | 65 wt % ANSI 80 | 180 | 35 wt % ANSI 120 | 106 |
| S12 | 65 wt % ANSI 80 | 180 | 35 wt % ANSI 150 | 75 |
| S13 | 65 wt % ANSI 80 | 180 | 35 wt % ANSI 240 | 45 |

2B. Abrasive Wheels Preparation—"Low" Density

Nonwoven abrasive wheels were prepared using the abrasive blend preparations of example 2A. Nonwoven substrate (lofty nonwoven fibers) was provided. The nonwoven substrates comprised air-laid (Rando-Webber machine), polyamide (Nylon 6,6), 0.5 to 2.5 inch length staple fibers having a 111 micron avg. dia. and an average linear density of 100 denier. The air-laid fibers of the nonwoven web were bound together with a latex acrylic web binder composition. The nonwoven substrate was porous and flexible, having a uniform fabric weight (fiber weight plus web binder weight) in a range of 200-300 gsm, and had a solid volume fraction (SVF) ranging from 1.5 to 3.5.

A polymeric make coat binder composition (polyurethane composition) was disposed onto and throughout the nonwoven web. A blend of abrasive particles (Control 2), as described above, was disposed onto the make coat and fibers of the nonwoven web by gravity coating. Notably, even though the abrasive particle deposition was accomplished by gravity coating, there was no noticeable separation of coarse-fine abrasive particle (i.e., the blend of abrasive particles was well dispersed on and throughout the web). The make coat binder composition was then cured.

A polymeric spray mixture composition (phenolic composition) was applied over the make coat and abrasive particles. The make coat and spray mixture composition were then cured.

A size coat composition (polyurethane composition) was then applied over the spray mixture composition. The size coat composition was then cured, thus forming a completed single layer sheet nonwoven abrasive article.

The single layer sheet of nonwoven abrasive was then formed into a convolute abrasive wheel by coating both sides of the nonwoven abrasive sheet with an adhesive composition (epoxy composition), winding the nonwoven abrasive sheet around a central core (a "hub") in a spiral manner, curing the adhesive, and then slicing to form a convolute abrasive wheel.

The process described above for the Control 2 abrasive wheel was repeated to construct abrasive wheels for each of the abrasive particle blends: S5-S7, Control 3, S8-S10, Control 4, and S11-S13. The only difference between the constructions of the abrasive wheels was the composition of the abrasive particle blend. The resulting abrasive wheels all had a "low" density in a range of 1.0 to 1.2 lb./100 in$^3$. Properties of the convolute abrasive wheels are described in Table 4.

TABLE 4

Abrasive Wheels - "Low" Density

| Sample Name | Density (lb./100 in$^3$) | Fiber ("F") Diameter (μm) | Primary Particle ("Gp") (μm) | Ratio Gp/F | Reinforcing Particle ("Gr") (μm) | Ratio Gr/F | Ratio Gp/Gr | Reinforcement Category |
|---|---|---|---|---|---|---|---|---|
| Control 2 low | 1.05-1.16 | 111 | 355 | 3.2 | 355 | 3.20 | 1.00 | 1 - Lowest |
| S5 low | 1.05-1.16 | 111 | 355 | 3.2 | 106 | 0.96 | 3.35 | 2 |
| S6 low | 1.05-1.16 | 111 | 355 | 3.2 | 75 | 0.68 | 4.73 | 3 |
| S7 low | 1.05-1.16 | 111 | 355 | 3.2 | 45 | 0.41 | 7.89 | 4 - Highest |
| Control 3 low | 1.05-1.16 | 111 | 250 | 2.25 | 250 | 2.25 | 1.0 | 1 - Lowest |
| S8 low | 1.05-1.16 | 111 | 250 | 2.25 | 106 | 0.96 | 2.36 | 2 |
| S9 low | 1.05-1.16 | 111 | 250 | 2.25 | 75 | 0.68 | 3.33 | 3 |
| S10 low | 1.05-1.16 | 111 | 250 | 2.25 | 45 | 0.41 | 5.56 | 4 - Highest |
| Control 4 low | 1.05-1.16 | 111 | 180 | 1.62 | 180 | 1.62 | 1.0 | 1 - Lowest |
| S11 low | 1.05-1.16 | 111 | 180 | 1.62 | 106 | 0.96 | 1.7 | 2 |
| S12 low | 1.05-1.16 | 111 | 180 | 1.62 | 75 | 0.68 | 2.4 | 3 |
| S13 low | 1.05-1.16 | 111 | 180 | 1.62 | 45 | 0.41 | 4.0 | 4 - Highest |

2C. Abrasive Wheels Preparation—"High" Density

Convolute nonwoven abrasive wheels were prepared using the abrasive blend preparations of example 2A. These nonwoven abrasive wheels were prepared using the same materials and procedure described above in example 2B, except that the resulting abrasive wheels all had a "high" density in a range of 2.1 to 2.4 lb./100 in$^3$. Properties of the convolute abrasive wheels are described in Table 5.

TABLE 5

Abrasive Wheels - "High" Density

| Sample Name | Density (lb./100 in³) | Fiber ('F') Diameter (μm) | Primary Particle ("Gp") (μm) | Ratio Gp/F | Reinforcing Particle ("Gr") (μm) | Ratio Gr/F | Ratio Gp/Gr | Reinforcement Category |
|---|---|---|---|---|---|---|---|---|
| Control 2 high | 2.15-2.38 | 111 | 355 | 3.2 | 355 | 3.20 | 1.00 | 1 - Lowest |
| S5 high | 2.15-2.38 | 111 | 355 | 3.2 | 106 | 0.96 | 3.35 | 2 |
| S6 high | 2.15-2.38 | 111 | 355 | 3.2 | 75 | 0.68 | 4.73 | 3 |
| S7 high | 2.15-2.38 | 111 | 355 | 3.2 | 45 | 0.41 | 7.89 | 4 - Highest |
| Control 3 high | 2.15-2.38 | 111 | 250 | 2.25 | 250 | 2.25 | 1.0 | 1 - Lowest |
| S8 high | 2.15-2.38 | 111 | 250 | 2.25 | 106 | 0.96 | 2.36 | 2 |
| S9 high | 2.15-2.38 | 111 | 250 | 2.25 | 75 | 0.68 | 3.33 | 3 |
| S10 high | 2.15-2.38 | 111 | 250 | 2.25 | 45 | 0.41 | 5.56 | 4 - Highest |
| Control 4 high | 2.15-2.38 | 111 | 180 | 1.62 | 180 | 1.62 | 1.0 | 1 - Lowest |
| S11 high | 2.15-2.38 | 111 | 180 | 1.62 | 106 | 0.96 | 1.7 | 2 |
| S12 high | 2.15-2.38 | 111 | 180 | 1.62 | 75 | 0.68 | 2.4 | 3 |
| S13 high | 2.15-2.38 | 111 | 180 | 1.62 | 45 | 0.41 | 4.0 | 4 - Highest |

2D. Abrasive Performance Testing—Ring Test

Figure 12:
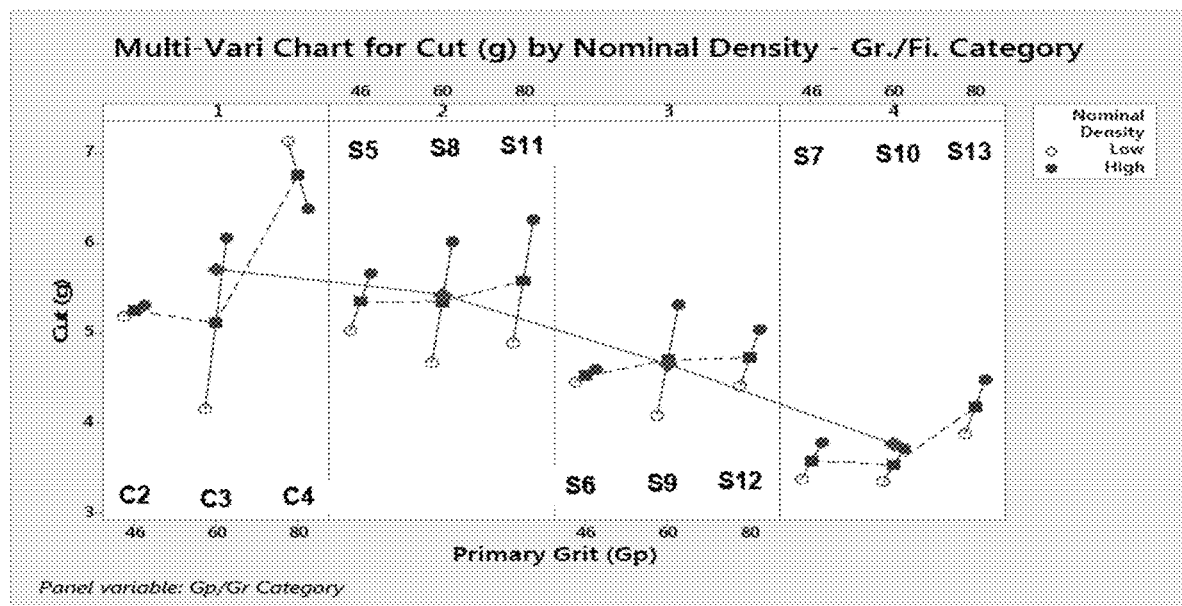
FIG. 12 is a multivariable graph showing the material removed from work pieces ("Cut") according to density and reinforcement category of the sample embodiments and control abrasive articles.
Figure 13:
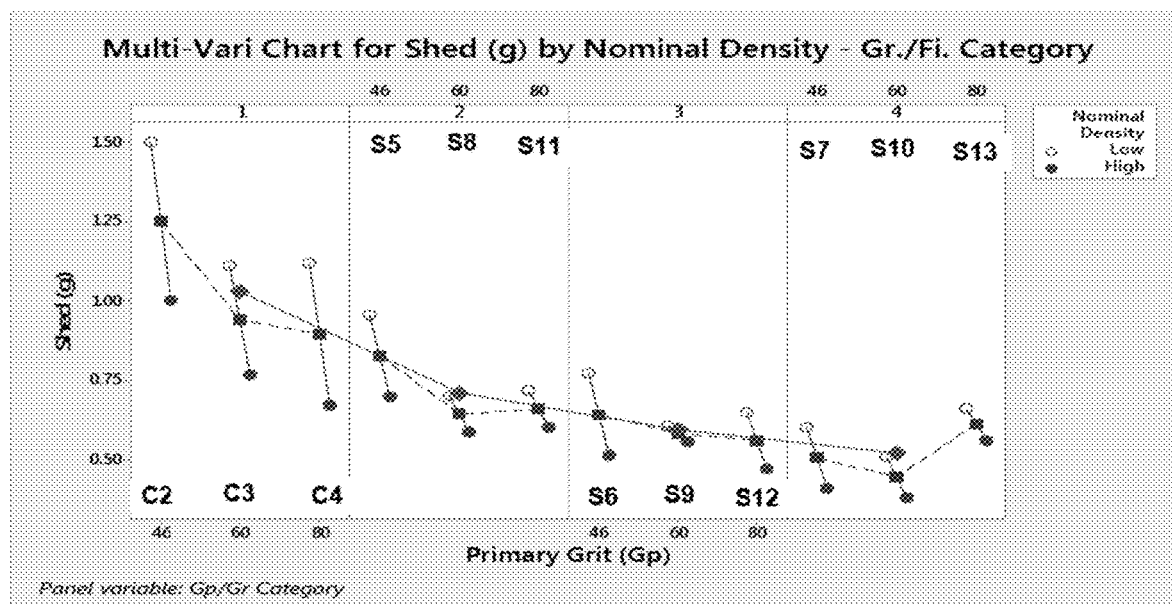
FIG. 13 is a multivariable graph showing the material lost ("Shed") from sample embodiments and control abrasive articles according to density and reinforcement category.
Figure 14:
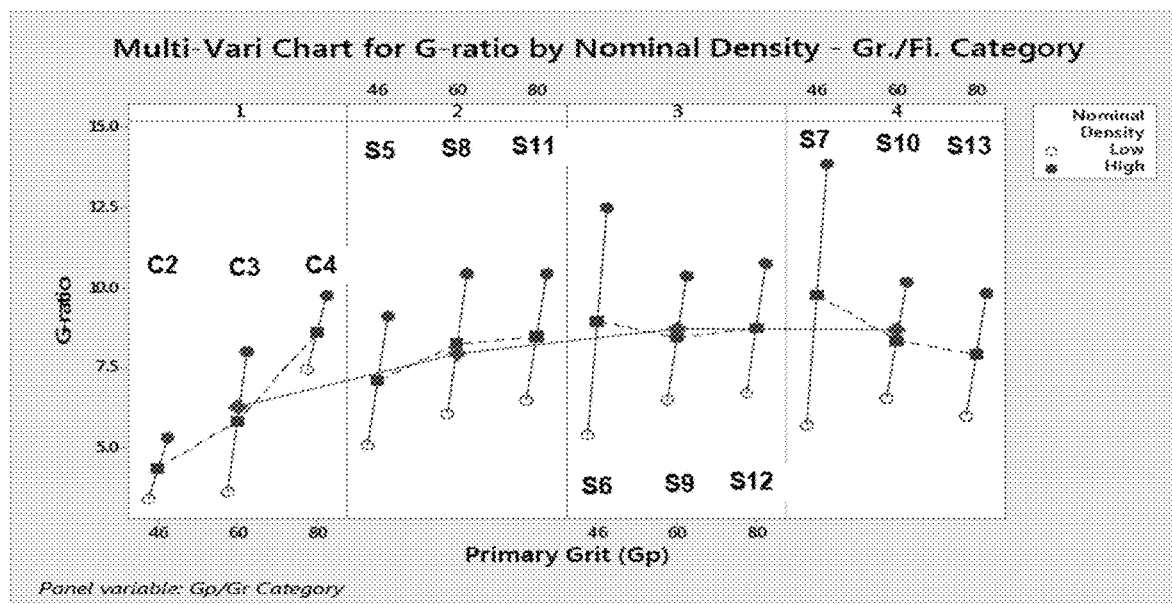
FIG. 14 is a multivariable graph showing the Grind Ratio ("G-Ratio") of the sample embodiments and control abrasive articles according to density and reinforcement category.
Figure 15:
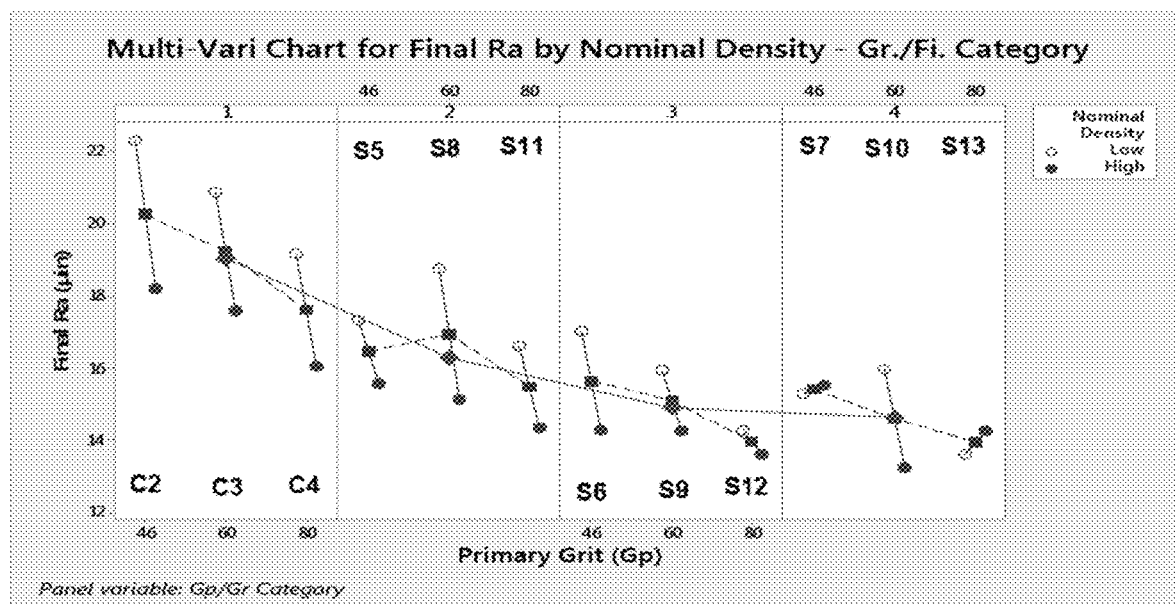
FIG. 15 is a multivariable graph showing the arithmetical mean roughness ("Ra") of workpieces abraded with sample embodiments and control abrasive articles according to density and reinforcement category.
Figure 16:
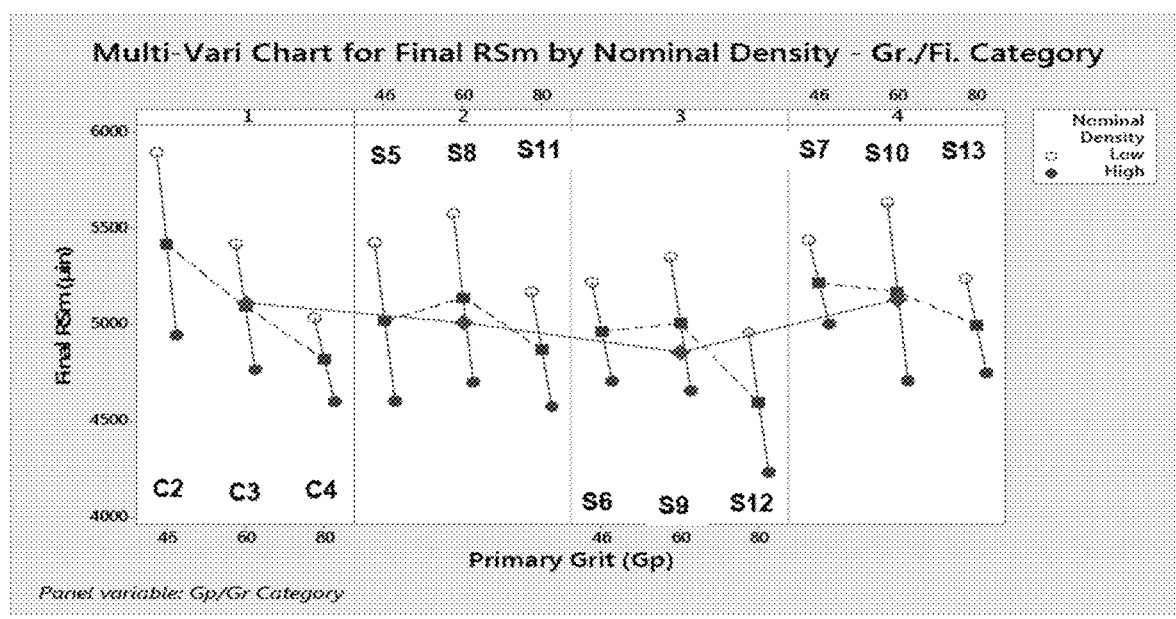
FIG. 16 is a multivariable graph showing the mean peak width ("RSm") of workpieces abraded with sample embodiments and control abrasive articles according to density and reinforcement category.
Figure 17A:
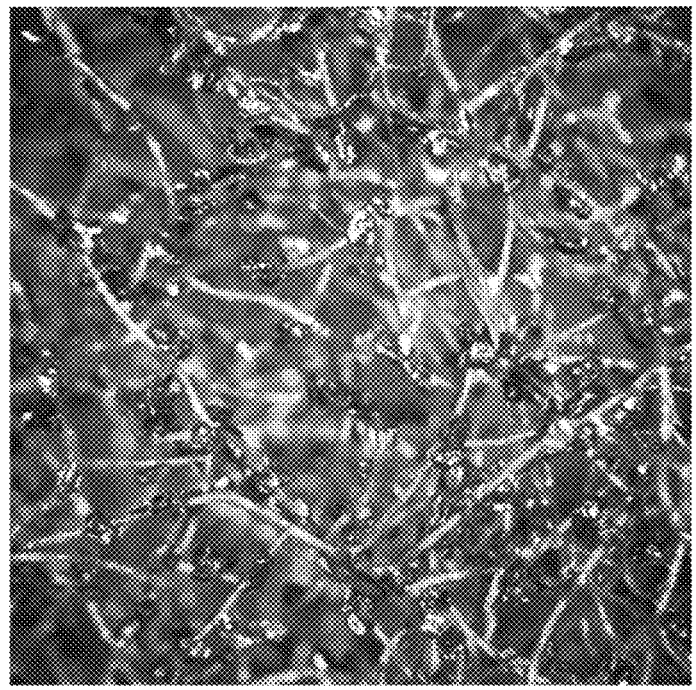
FIG. 17A is a microphotograph of a nonwoven abrasive according to an embodiment showing a 100 wt % of primary abrasive particles (ANSI 46) disposed on and adhered to the fibers of a nonwoven substrate that is coated with a binder composition.
Figure 17B:
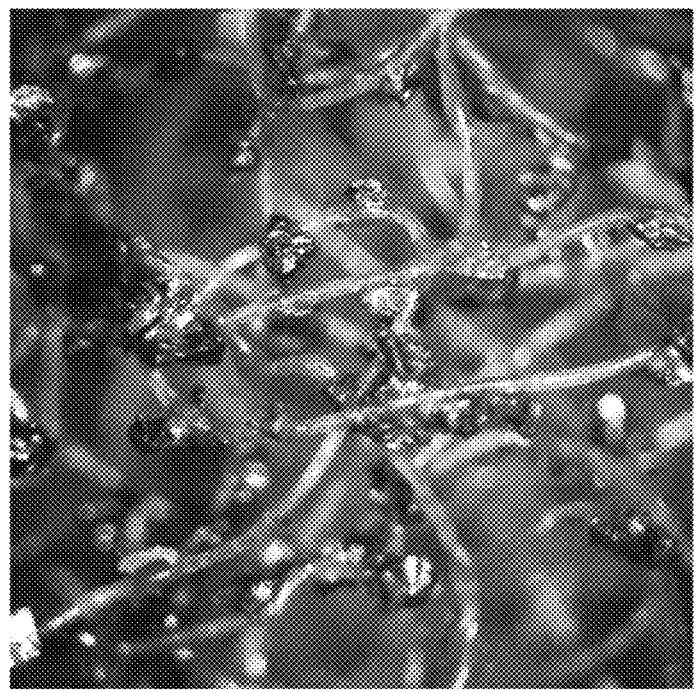
FIG. 17B is a microphotograph showing an increased magnification ("zoomed in") of the embodiment of 17A.
Figure 18A:
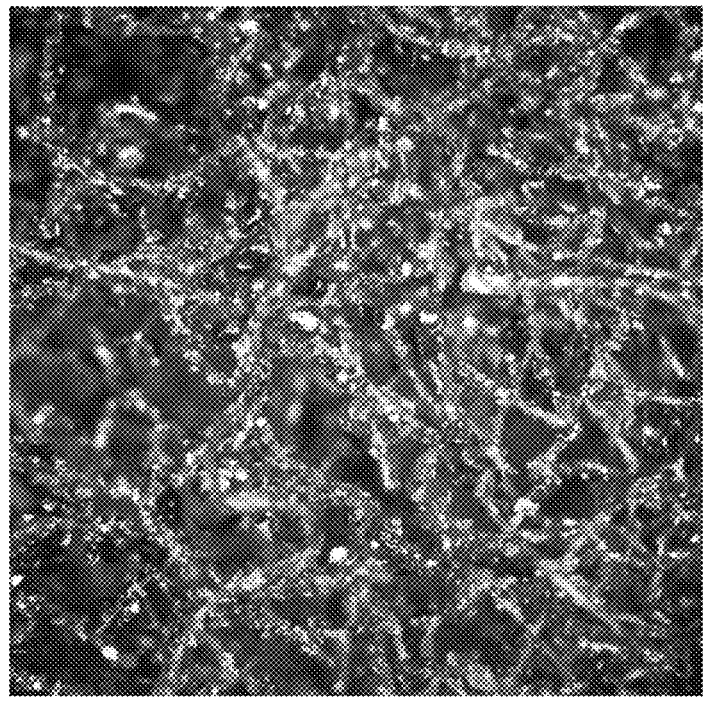
FIG. 18A is a microphotograph of a nonwoven abrasive according to an embodiment showing a blend of 65 wt % of primary abrasive particles (ANSI 46) and 35 wt % of reinforcing abrasive particles (ANSI 120) disposed on and adhered to the fibers of a nonwoven substrate that is coated with a binder composition.
Figure 18B:
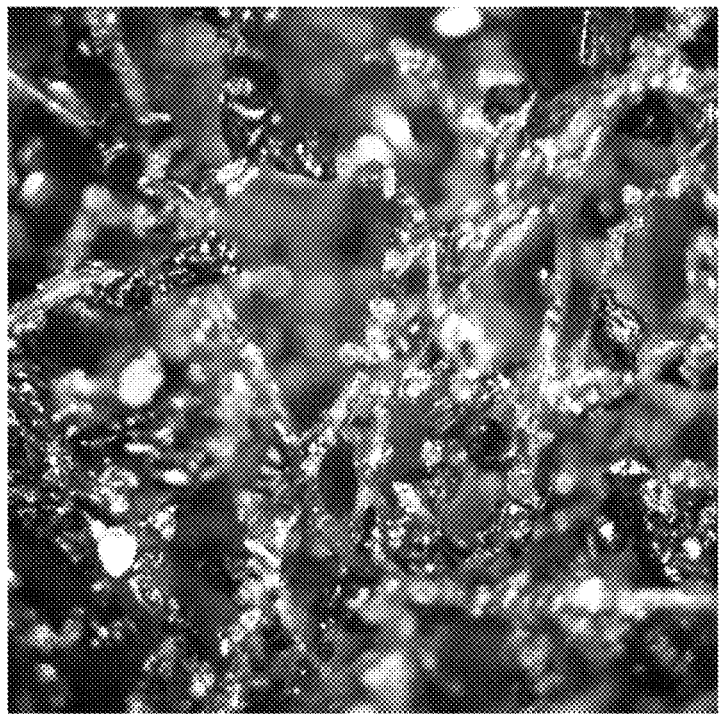
FIG. 18B is a microphotograph showing an increased magnification ("zoomed in") of the embodiment of 18A.
Figure 19A:
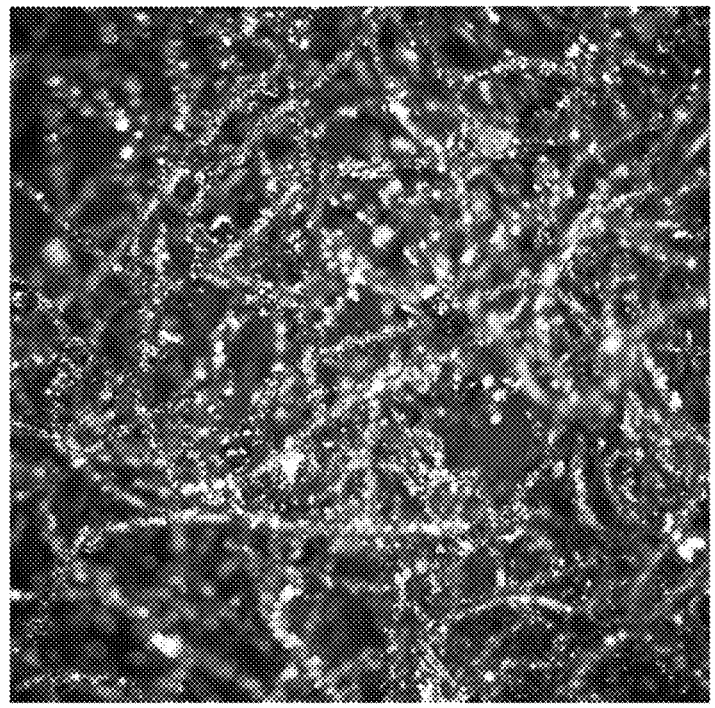
FIG. 19A is a microphotograph of a nonwoven abrasive according to an embodiment showing a blend of 65 wt % of primary abrasive particles (ANSI 46) and 35 wt % of reinforcing abrasive particles (ANSI 150) disposed on and adhered to the fibers of a nonwoven substrate that is coated with a binder composition.
Figure 19B:
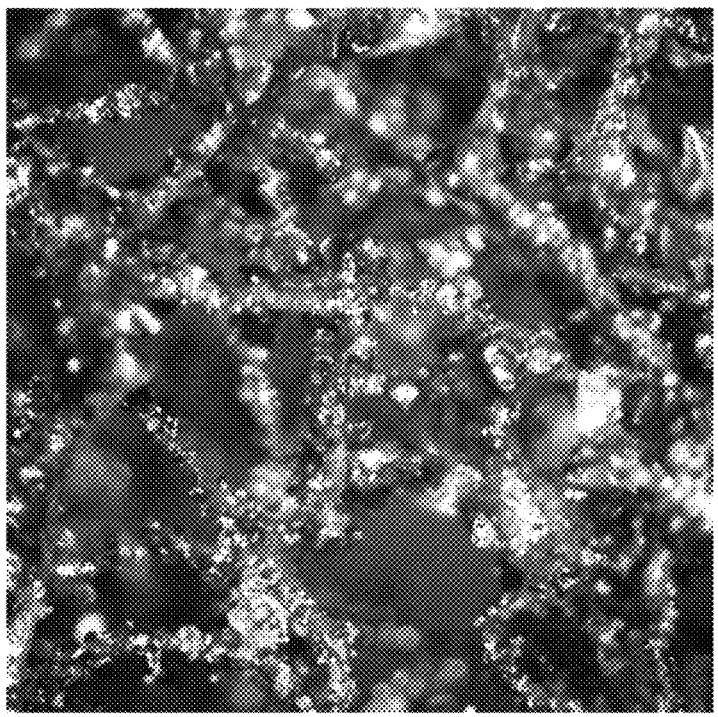
FIG. 19B is a microphotograph showing an increased magnification ("zoomed in") of the embodiment of 19A.
Figure 20A:
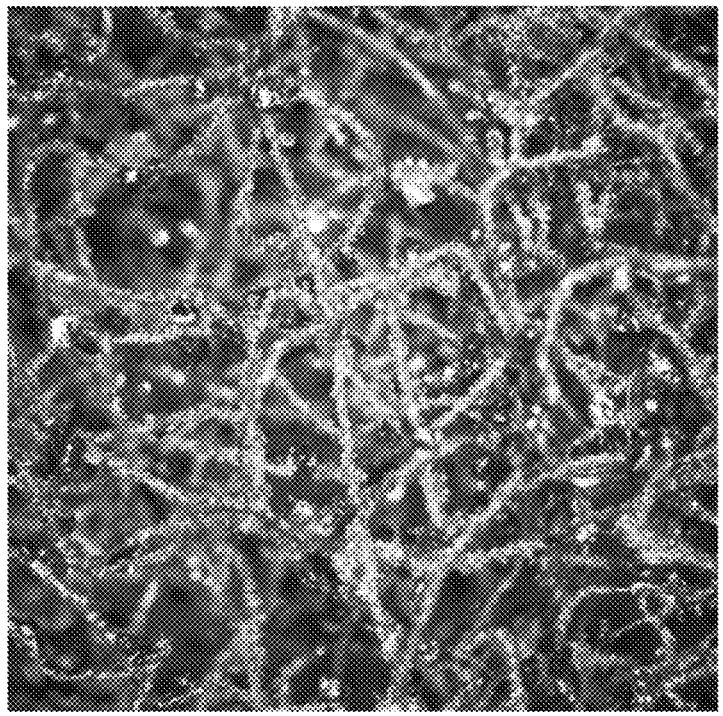
FIG. 20A is a microphotograph of a nonwoven abrasive according to an embodiment showing a blend of 65 wt % of primary abrasive particles (ANSI 46) and 35 wt % of reinforcing abrasive particles (ANSI 240) disposed on and adhered to the fibers of a nonwoven substrate that is coated with a binder composition.
Figure 20B:
FIG. 20B is a microphotograph showing an increased magnification ("zoomed in") of the embodiment of 20A.

The Control and Sample abrasive wheels of example 2B, Table 4 and Table 5, were subjected to abrasive performance testing. A Ring Test was conducted at low pressure (7 lb.) at 2700 rpm for 10 min cycles on stainless steel (SS304) workpieces for each of the abrasive wheels. The total amount of material removed from the workpiece (Average cut), total amount of material lost from the abrasive wheel (Average shed), and grind ratio (Average cut/Average shed) were recorded and testing results are shown below in Table 6 and FIG. 12-14. Surface roughness measurements (8 points on the ring) of arithmetical mean roughness (Ra) and mean peak width (RSm) were also measured and testing results are shown in Table 7 and FIG. 15-16.

TABLE 6

Abrasive Performance Results - "Low" and "High" Density Wheels

| Sample Name | Avg. Cut (g) | Avg. Shed (g) | Grind Ratio | Grind Ratio relative to Control 2 low |
|---|---|---|---|---|
| Control 2 low | 5.2 | 1.5 | 3.4 | 100% |
| S5 low | 5.0 | 1.0 | 5.1 | 150% |
| S6 low | 4.4 | 0.8 | 5.4 | 159% |
| S7 low | 3.4 | 0.6 | 5.7 | 168% |

| Sample Name | Avg. Cut (g) | Avg. Shed (g) | Grind Ratio | Grind Ratio relative to Control 3 low |
|---|---|---|---|---|
| Control 3 low | 4.2 | 1.1 | 3.7 | 100% |
| S8 low | 4.7 | 0.7 | 6.1 | 165% |
| S9 low | 4.1 | 0.6 | 6.5 | 176% |
| S10 low | 3.3 | 0.5 | 6.5 | 176% |

| Sample Name | Avg. Cut (g) | Avg. Shed (g) | Grind Ratio | Grind Ratio relative to Control 4 low |
|---|---|---|---|---|
| Control 4 low | 7.1 | 1.1 | 7.5 | 100% |
| S11 low | 4.9 | 0.7 | 6.5 | 87% |
| S12 low | 4.4 | 0.6 | 6.7 | 89% |
| S13 low | 3.9 | 0.7 | 6.0 | 80% |

| Sample Name | Avg. Cut (g) | Avg. Shed (g) | Grind Ratio | Grind Ratio relative to Control 2 high |
|---|---|---|---|---|
| Control 2 high | 5.3 | 1.0 | 5.3 | 100% |
| S5 high | 5.7 | 0.7 | 9.1 | 172% |
| S6 high | 4.6 | 0.5 | 12.5 | 236% |
| S7 high | 3.8 | 0.4 | 13.9 | 262% |

| Sample Name | Avg. Cut (g) | Avg. Shed (g) | Grind Ratio | Grind Ratio relative to Control 3 high |
|---|---|---|---|---|
| Control 3 high | 6.1 | 0.8 | 8.0 | 100% |
| S8 high | 6.0 | 0.4 | 10.4 | 130% |
| S9 high | 5.3 | 0.6 | 10.4 | 130% |
| S10 high | 3.7 | 0.4 | 10.2 | 128% |

| Sample Name | Avg. Cut (g) | Avg. Shed (g) | Grind Ratio | Grind Ratio relative to Control 4 high |
|---|---|---|---|---|
| Control 4 high | 6.4 | 0.7 | 9.8 | 100% |
| S11 high | 6.3 | 0.6 | 10.4 | 106% |
| S12 high | 5.0 | 0.5 | 10.8 | 110% |
| S13 high | 4.5 | 0.6 | 9.8 | 100% |

TABLE 7

Surface Roughness Results - Ra and RSm

| Sample Name | Final Ra (μinch) | Final Ra relative to Control 2 low | Final RSm (μinch) | Final RSm relative to Control 2 low | Visual Impact relative to Control 2 low |
|---|---|---|---|---|---|
| Control 2 low | 22.3 | 100% | 5896 | 100% | None |
| S5 low | 17.3 | 78% | 5429 | 92% | None |
| S6 low | 17.0 | 76% | 5223 | 89% | None |
| S7 low | 15.3 | 69% | 5440 | 92% | None |

| Sample Name | Final Ra (μinch) | Final Ra relative to Control 3 low | Final RSm (μinch) | Final RSm relative to Control 3 low | Visual Impact relative to Control 3 low |
|---|---|---|---|---|---|
| Control 3 low | 20.9 | 100% | 5420 | 100% | None |
| S8 low | 18.8 | 90% | 5579 | 103% | None |
| S9 low | 16.0 | 77% | 5352 | 99% | None |
| S10 low | 16.0 | 77% | 5635 | 104% | None |

| Sample Name | Final Ra (μinch) | Final Ra relative to Control 4 low | Final RSm (μinch) | Final RSm relative to Control 4 low | Visual Impact relative to Control 4 low |
|---|---|---|---|---|---|
| Control 4 low | 19.2 | 100% | 5036 | 100% | None |
| S11 low | 16.6 | 86% | 5171 | 103% | None |
| S12 low | 14.3 | 74% | 4958 | 98% | None |
| S13 low | 13.6 | 71% | 5241 | 104% | None |

| Sample Name | Final Ra (μinch) | Final Ra relative to Control 2 high | Final RSm (μinch) | Final RSm relative to Control 2 high | Visual Impact relative to Control 2 high |
|---|---|---|---|---|---|
| Control 2 high | 18.2 | 100% | 4946 | 100% | None |
| S5 high | 15.6 | 86% | 4605 | 93% | None |
| S6 high | 14.3 | 81% | 4707 | 95% | None |
| S7 high | 15.6 | 75% | 5001 | 101% | None |

| Sample Name | Final Ra (μinch) | Final Ra relative to Control 3 high | Final RSm (μinch) | Final RSm relative to Control 3 high | Visual Impact relative to Control 3 high |
|---|---|---|---|---|---|
| Control 3 high | 17.6 | 100% | 4768 | 100% | None |
| S8 high | 15.2 | 86% | 4702 | 99% | None |
| S9 high | 14.3 | 81% | 4659 | 98% | None |
| S10 high | 13.2 | 75% | 4711 | 99% | None |

| Sample Name | Final Ra (μinch) | Final Ra relative to Control 4 high | Final RSm (μinch) | Final RSm relative to Control 4 high | Visual Impact relative to Control 4 high |
|---|---|---|---|---|---|
| Control 4 high | 16.1 | 100% | 4600 | 100% | None |
| S11 high | 14.4 | 89% | 4574 | 99% | None |
| S12 high | 13.6 | 84% | 4234 | 92% | None |
| S13 high | 14.3 | 89% | 4752 | 103% | None |

The abrasive performance and surface finish data indicate surprising and beneficial results. The abrasive performance data indicates that the reinforcing grain (Gr) tends to reduce the amount of cut, but surprisingly reinforces the substrate to such a degree that the amount of material shed from the wheel during grinding is greatly diminished, which unexpectedly produces a significantly higher and beneficial grinding performance (G-ratio). As can be seen the larger the primary grit (i.e., the larger the primary particle), the more substantial the reinforcement effect of the secondary particle appears to be. Thus, the G-ratio increase appears to be generated by the addition of reinforcing particles that are smaller than the web fiber diameter. With regard to the surface finish data, it was noted that, unexpectedly, the reinforcing grits did not interrupt the surface finish performance and did not impact the visual look of the finished piece. This was unexpected because, one would expect that introducing smaller particles would interrupt the uniformity of roughness (i.e., the size and depth of scratches) created by the bigger primary abrasive particles. In other words, it was expected that the smaller particles were going to create fine scratch depths/patterns that would be disrupting to and significantly different than the average scratch/roughness values (Ra, RSm) produced by the large particles, which was not the case.

What is claimed is:

1. An abrasive article comprising:
  a substrate comprising a web of lofty nonwoven fibers;
  a first polymeric binder ("make") composition disposed on the nonwoven fibers; and
  a blend of abrasive particles disposed on the polymeric binder,
  wherein the fibers have an average fiber diameter (Fdia),
  wherein the blend comprises a plurality of first abrasive particles ("primary particles") having an average particle size ($P1_{D50}$) that is equal to or larger than the average fiber diameter, and
wherein the blend comprises a plurality of second abrasive particles ("reinforcing particles") having an average particle size ($P2_{D50}$) that is smaller than the average fiber diameter,
wherein the abrasive particle blend comprises W to 85 wt % of the primary abrasive particle; and
15 to 40 wt % of the reinforcing abrasive particle.

2. The abrasive article of claim 1, further comprising a second polymeric binder ("size coat") disposed on the blend of abrasive particles and the fibers.

3. The abrasive article of claim 2, further comprising a third polymeric binder ("web binder") disposed on the fibers and adhering the fibers together to form the web of lofty nonwoven fibers, wherein the third polymeric binder is disposed between the fibers and the first polymeric binder ("make") composition.

4. The abrasive article of claim 1, wherein the ratio of the average primary particle size ($P1_{D50}$) to the average fiber diameter (Fdia) is in a range from 1.0:1.0 to 8.0:1.0.

5. The abrasive article of claim 1, wherein the ratio of the average reinforcing particle size ($P2_{D50}$) to the average fiber diameter (Fdia) is in a range from 0.1:1.0 to 0.99:1.0.

6. The abrasive article of claim 1, wherein the average fiber diameter (Fdia) ranges from 10 micrometers to 500 micrometers.

7. The abrasive article of claim 1, wherein the average fiber diameter (Fdia) ranges from 1 denier to 300 denier.

8. The abrasive article of claim 1, wherein the average primary particle size ($P1_{D50}$) ranges from 30 micrometers to 1000 micrometers.

9. The abrasive article of claim 1, wherein the average reinforcing particle size ($P1_{D50}$) ranges from 5 micrometers to 250 micrometers.

10. The abrasive article of claim 1, wherein the abrasive particle blend comprises:
    65 to 85 wt % of the primary abrasive particle; and
    15 to 35 wt % of the reinforcing abrasive particle.

11. The abrasive article of claim 1, wherein the abrasive particle blend comprises
    60 to 70 wt % of the primary abrasive particle; and
    30 to 40 wt % of the reinforcing abrasive particle.

12. The abrasive article of claim 3, wherein the abrasive article comprises:
    30 to 70 wt % abrasive particles (i.e. the blend of abrasive particles);
    5 to 35 wt % substrate (i.e., the web of lofty nonwoven fibers);
    up to 10 wt % web binder;
    5 to 15 wt % make coat;
    20 to 40 wt % size coat, and
    0 to 15 wt % supersize.

13. The abrasive article of claim 1, wherein the primary abrasive particle comprises alumina, alumina zirconia, silicon carbide, cubic boron nitride, diamond, or a combination thereof.

14. The abrasive article of claim 1, wherein the composition of the reinforcing abrasive particle is the same as the composition of the primary abrasive particle.

15. The abrasive article of claim 1, wherein the fibers comprise banana fibers, cellulose fibers, cotton fibers, flax fibers, hemp fibers, jute fibers, kenaf fibers, sisal fibers, viscose fibers, rayon fibers, poly-cotton fibers, carbon fibers, polyaramid fibers (e.g., Kevlar®, Twaron®), polyamide fibers (Nylon 6 (poly(hexano-6-lactam)); Nylon 6,6 (Poly[imino(1,6-dioxohexamethylene) iminohexamethylene]), polyamine fibers, polyester fibers, polyethylene fibers, polyimide fibers, polypropylene fibers, glass fibers, metal fibers, ceramic fibers, or combinations thereof.

16. The abrasive article of claim 1, wherein the substrate is air laid.

17. The abrasive article of claim 1, wherein the fibers are staple fibers having a length ranging from 10-90 mm.

18. The abrasive article of claim 1, wherein the substrate has a weight of 80-700 GSM (6-46 lb/ream).

19. A method of making an abrasive article comprising:
    forming a web of lofty nonwoven fibers;
    disposing a first polymeric binder precursor on the web;
    disposing a blend of primary abrasive particles and reinforcing abrasive particles onto the first binder precursor occurs;
    disposing a second polymeric binder precursor onto the blend of abrasive particles and the first binder precursor; and
    curing the binder precursors to form the abrasive article,
        wherein the fibers have an average fiber diameter (Fdia),
        wherein the blend comprises a plurality of first abrasive particles ("primary particles") having an average particle size ($P1_{D50}$) that is equal to or larger than the average fiber diameter, and
    wherein the blend comprises a plurality of second abrasive particles ("reinforcing particles") having an average particle size ($P2_{D50}$) that is smaller than the average fiber diameter,
        wherein the abrasive particle blend comprises 60 to 85% of the primary abrasive particle; and
        15 to 40 wt % of the reinforcing abrasive particle.

20. The method of claim 19, wherein the blend of primary abrasive particles and reinforcing abrasive particles is formed by mixing together a plurality of primary abrasive particles and a plurality reinforcing abrasive particles.

* * * * *

UNITED STATES PATENT AND TRADEMARK OFFICE
CERTIFICATE OF CORRECTION

| | |
|---|---|
| PATENT NO. | : 11,504,823 B2 |
| APPLICATION NO. | : 16/370799 |
| DATED | : November 22, 2022 |
| INVENTOR(S) | : Hooman Amid et al. |

It is certified that error appears in the above-identified patent and that said Letters Patent is hereby corrected as shown below:

In the Claims

Column 23, Line 7-8, Claim 1, please delete "comprises W to 85 wt %", and insert --comprises 60 to 85 wt%--

Column 24, Line 44-45, Claim 19, please delete "comprises 60 to 85%", and insert --comprises 60 to 85 wt%--

Signed and Sealed this
Eighteenth Day of June, 2024

Katherine Kelly Vidal
*Director of the United States Patent and Trademark Office*